(12) United States Patent
Street et al.

(10) Patent No.: US 8,979,077 B2
(45) Date of Patent: Mar. 17, 2015

(54) GAS SPRING END MEMBER AS WELL AS GAS SPRING ASSEMBLY AND SUSPENSION SYSTEM INCLUDING SAME

(75) Inventors: Stephen C. Street, Carmel, IN (US); Paul P. Koeske, Fishers, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 165 days.

(21) Appl. No.: 13/434,490

(22) Filed: Mar. 29, 2012

(65) Prior Publication Data

US 2012/0267836 A1  Oct. 25, 2012

Related U.S. Application Data

(60) Provisional application No. 61/469,058, filed on Mar. 29, 2011, provisional application No. 61/529,054, filed on Aug. 30, 2011.

(51) Int. Cl.
*F16F 9/04* (2006.01)
*B60G 11/28* (2006.01)

(52) U.S. Cl.
CPC .......... *B60G 11/28* (2013.01); *B60G 2202/152* (2013.01); *B60G 2204/126* (2013.01); *Y10T 29/49609* (2013.01)
USPC ............................ 267/64.27; 267/122; 267/31

(58) Field of Classification Search
CPC ... B60G 11/28; B60G 2204/126; F16F 9/057; F16F 9/0454
USPC .................. 267/64.27, 122, 31, 64.21, 64.23, 267/64.24; 280/124.163
See application file for complete search history.

(56) References Cited

U.S. PATENT DOCUMENTS

| | | | | |
|---|---|---|---|---|
| 1,276,151 | A | * | 8/1918 | Witt ........................... 267/64.27 |
| 3,730,548 | A | | 5/1973 | Thaxton |
| 3,866,894 | A | * | 2/1975 | Sweet et al. ..................... 267/31 |
| 3,970,293 | A | * | 7/1976 | Sweet et al. ..................... 267/31 |
| 4,000,913 | A | * | 1/1977 | Gibson ........................ 280/86.5 |
| 4,099,741 | A | * | 7/1978 | Sweet et al. ........... 280/124.163 |
| 4,643,447 | A | * | 2/1987 | Rogers ................... 280/124.163 |
| 5,013,063 | A | | 5/1991 | Mitchell |
| 5,464,245 | A | * | 11/1995 | Vogler ................... 280/124.163 |
| 2002/0180126 | A1 | | 12/2002 | Delizo et al. |

FOREIGN PATENT DOCUMENTS

EP  0 914 976  5/1999

OTHER PUBLICATIONS

European Search Report.

* cited by examiner

*Primary Examiner* — Xuan Lan Nguyen
(74) *Attorney, Agent, or Firm* — Jason A. Houser; Fay Sharpe LLP

(57) ABSTRACT

A gas spring end member is dimensioned for securement along an associated suspension member having an associated planar surface and at least an associated first side surface. The gas spring end member can include a base wall disposed transverse to a longitudinal axis and a bracket wall that extends longitudinally-outwardly from the base wall. The bracket wall can be adapted for operative connection to the associated suspension member such that the gas spring end member can be supported thereon with the base wall disposed in longitudinally spaced-apart relation to the associated planar surface of the associated suspension member. A gas spring assembly including such an end member can be included. A suspension system and a method of installation including such a gas spring assembly can also be included.

25 Claims, 11 Drawing Sheets

GAS SPRING END MEMBER AS WELL AS GAS SPRING ASSEMBLY AND SUSPENSION SYSTEM INCLUDING SAME

This application claims priority from U.S. Provisional Patent Application No. 61/469,058, filed on 29 Mar. 2011, and U.S. Provisional Patent Application No. 61/529,054, filed on 30 Aug. 2011, both of which are hereby incorporated herein by reference in their entirety.

BACKGROUND

The subject matter of the present disclosure broadly relates to the art of gas spring devices and, more particularly, to a gas spring end member that is dimensioned for securement along an associated structural component. A gas spring assembly including such a gas spring end member and a suspension system including at least one of such gas spring assemblies are also disclosed.

The subject matter of the present disclosure may find particular application and use in conjunction with suspension systems of wheeled vehicles, and may be described herein with specific reference thereto. However, it is to be appreciated that the subject matter of the present disclosure is also amenable to use in other applications and environments, and that the specific uses shown and described herein are merely exemplary. For example, the subject matter of the present disclosure could be used in support structures, height adjusting systems and/or actuators associated with industrial machinery, components thereof and/or other such equipment.

Development efforts are routinely undertaken to reduce energy consumption of motor vehicles. In particular, such efforts are often directed to reducing energy consumption associated with the use of vehicles during travel over roadways. In some cases, such development efforts can also (or, in the alternative) involve improvements in the performance of motor vehicles. Examples of motor vehicles to which such development efforts may be directed can include passenger vehicles and light-duty trucks as well as heavy duty trucks and tractor-trailer combinations.

One factor that has been identified as being capable of contributing to the achievement of such energy consumption and/or performance goals relates to reducing the overall mass of vehicles. In such case, the cumulative effect of reducing the size and/or weight of individual component parts of the vehicle, such as suspension components, for example, can result in reduced energy usage and/or other performance improvements of vehicles. One additional benefit of reducing the size and/or weight of component parts of a vehicle is that reduced costs can, in some cases, be achieved, such as, for example, may be due to the use of less material in the component parts. Furthermore, alternate designs and/or configurations may be used for the mass-reduced component parts, and alternate manufacturing processes and/or techniques may be used to produce such component parts. In some cases, these alternate designs, configurations, manufacturing processes and/or techniques may result in features that have a wider tolerance range and/or a less refined finish.

As a result of the foregoing and/or other development efforts involving vehicle structures and/or structural components, such as suspension components, for example, certain vehicle structures may become less well suited for the mounting and/or securement of other suspension components, such as gas spring assemblies, for example. Accordingly, it is believed desirable to develop a gas spring piston, as well as a gas spring assembly and suspension system including at least one of the same, that is/are capable of overcoming one or more of the foregoing and/or other disadvantages associated with known gas spring assembly designs.

BRIEF SUMMARY

One example of a gas spring end member in accordance with the subject matter of the present disclosure can have a longitudinal axis and can be dimensioned for securement along an associated structural member having an associated planar surface and an associated side surface oriented transverse to the associated planar surface. The gas spring end member can include a base wall that is oriented transverse to the longitudinal axis. A bracket wall can project from along the base wall and can terminate at a distal end disposed in axially-spaced relation to the base wall. The bracket wall can include an inside surface disposed in approximate alignment with the axis and dimensioned to abuttingly engage the associated side surface of the associated securement feature. A passage can extend through the bracket wall in transverse orientation to the axis. The passage can be positioned in axially-spaced relation to the base wall and can be dimensioned to receive an associated fastener such that the gas spring end member can be secured along the associated structural member by the associated fastener. In such case, the inside surface of the bracket wall can be disposed in abutting engagement with the associated side surface and the base wall can be disposed in spaced-apart relation to the associated planar surface.

One example of a gas spring assembly in accordance with the subject matter of the present disclosure can be dimensioned for securement along an associated suspension member that has an associated planar surface and associated first and second side surfaces that are disposed transverse to the associated planar surface. The gas spring assembly can include a flexible wall that is formed from elastomeric material and that extends circumferentially about a longitudinal axis between a first end and a second end that is spaced longitudinally from the first end. The flexible wall can at least partially define a spring chamber. A first end member can be operatively connected across the first end of the flexible wall. A second end member can be operatively connected across the second end of the flexible wall. The second end member can include a base wall that is disposed transverse to the longitudinal axis and a bracket wall that extends longitudinally-outwardly from the base wall in a direction opposite the flexible wall. The bracket wall can be disposed in approximate alignment with the longitudinal axis. The base wall and the bracket wall can at least partially define a channel dimensioned to receive the associated suspension member such that the second end member can be supported on the associated suspension member with the base wall disposed in longitudinally spaced-apart relation to the associated planar surface of the associated suspension member and such that a gap can be formed between the base wall and the associated planar surface.

A gas spring assembly according to the foregoing paragraph can include the bracket wall being secured in abutting engagement with at least the associated first side surface of the associated structural component such that, during use, axial forces acting on the second end member can be substantially entirely carried to the associated suspension member by the associated fastener.

Another example of a gas spring assembly in accordance with the subject matter of the present disclosure can be provided that is dimensioned for securement along an associated suspension member using an associated securement device. The associated suspension member can have an associated top surface, associated side surfaces and an associated mounting passage extending through the associated suspension member between the associated side surfaces. The associated mounting passage can be dimensioned to receive the associated securement device. The gas spring assembly can include a flexible wall that is formed from elastomeric material and that extends circumferentially about a longitudinal axis between opposing first and second ends to at least partially define a spring chamber. A first end member can be operatively connected across the first end of the flexible wall. A second end member can be operatively connected across the second end of the flexible wall. The second end member can include a base wall disposed transverse to the longitudinal axis and a bracket wall extending longitudinally-outwardly of the base wall and disposed in approximate alignment with the longitudinal axis. The bracket wall can include a mounting passage extending therethrough that is dimensioned to receive the associated securement device. In this manner, the bracket wall can be operatively connected to the associated suspension member such that the second end member can be supported thereon with the base wall disposed in longitudinally spaced-apart relation to the associated top surface and such that a force acting on the gas spring assembly in a substantially longitudinal direction results in the second end member generating shear forces in the associated securement device.

One example of a suspension system in accordance with the subject matter of the present disclosure can include an elongated suspension component of an associated vehicle. The suspension component can include a top planar surface and a first side surface disposed transverse to the top planar surface. A second side surface can be disposed in approximate alignment with the first side surface and in spaced relation thereto such that a component width is defined therebetween. A passage wall that at least partially defines a passage can extend in a widthwise direction between the first and second side surfaces. A gas spring assembly according to any one of the foregoing three paragraphs can be disposed along the elongated suspension component such that at least the passage of the bracket wall is at least approximately aligned with the passage of the suspension component. A fastener can extend along the passage of the bracket wall and the passage of the suspension component. The fastener can be operative to secure at least the bracket wall in abutting engagement with the first side surface of the suspension component. In this manner, the second end member can be supported on the suspension component with the base wall disposed in longitudinally spaced-apart relation to the top planar surface and such that a gap is maintained between the base wall and the top planar surface.

One example of a method of assembling a suspension system in accordance with the subject matter of the present disclosure can include providing an elongated suspension component of an associated vehicle. The suspension component can include a top planar surface and a first side surface disposed transverse to the top planar surface. A second side surface can be disposed in approximate alignment with the first side surface and in spaced relation thereto such that a component width is defined therebetween. A passage wall can at least partially define a passage extending in a widthwise direction between the first and second side surfaces. The method can also include providing a gas spring assembly according to any one of foregoing four paragraphs, and positioning the gas spring assembly along the suspension component such that at least the passage of the bracket wall is at least approximately aligned with the passage of the suspension component. The method can further include extending a fastener along the passage of the bracket wall and the passage of the suspension component. The method can also include securing at least the bracket wall in abutting engagement with the first side surface of the suspension component using the fastener. In this manner, the second end member can be supported on the suspension component with the base wall disposed in longitudinally spaced-apart relation to the top planar surface and such that a gap is maintained between the base wall and the top planar surface.

DETAILED DESCRIPTION

Figure 1:
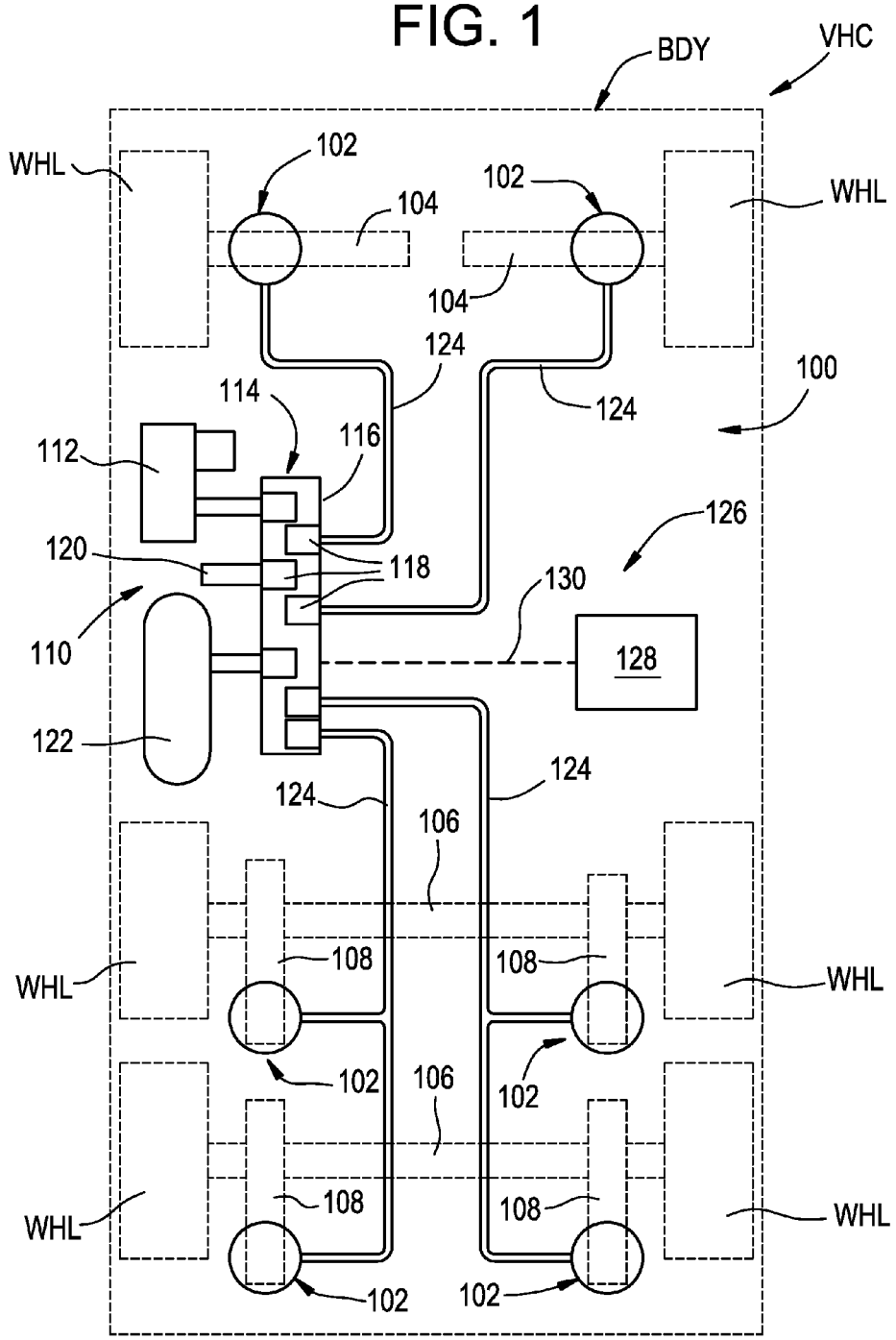
FIG. 1 is a schematic representation of one example of a vehicle including a suspension system and gas spring assemblies in accordance with the subject matter of the present disclosure.

Turning now to the drawings, wherein the showings are for the purpose of illustrating examples of the subject matter of the present disclosure and which are not intended as a limitation of the same, FIG. 1 illustrates one example of a suspension system 100 disposed between a sprung mass, such as an associated vehicle body BDY, for example, and an unsprung mass, such as an associated wheel WHL or an associated wheel-engaging member or axle, for example, of an associated vehicle VHC. It will be appreciated that any such suspension system can include any number of one or more systems, components and/or devices, and that the same can be operatively connected between the sprung and unsprung masses of the associated vehicle in any suitable manner. For example, such a suspension system can include a plurality of damping members (not shown), which can be operatively connected between the sprung and unsprung masses of the associated vehicle in any suitable manner.

Additionally, or in the alternative, such a suspension system can include a plurality of gas spring assemblies that are supported between the sprung and unsprung masses of associated vehicle VHC. In the embodiment shown in FIG. 1, suspension system 100 includes six gas spring assemblies, one or more of which is disposed toward each corner of the associated vehicle adjacent a corresponding wheel WHL thereof. It will be appreciated, however, that any other suitable number of gas spring assemblies could alternately be used and/or that such gas spring assemblies can be disposed in any other suitable configuration and/or arrangement. In the exemplary arrangement schematically represented in FIG. 1, a plurality of gas spring assemblies 102 are operatively connected between the sprung and unsprung masses of the vehicle with two of gas spring assemblies 102 operatively associated with front wheel-engaging members 104 of vehicle VHC and the remaining gas spring assemblies operatively associated with rear wheel-engaging members 106 of vehicle VHC. In particular, rear wheel-engaging members 106 are shown as including trailing arms 108 that are operatively connected to the rear wheel-engaging members with gas spring assemblies 102 operatively disposed between a trailing arm and the sprung mass (e.g., body BDY) of the vehicle. It will be appreciated, however, that other suitable arrangements and/or configurations could alternately be used.

Suspension system 100 can also optionally include a pressurized gas system 110 that is operatively associated with the gas spring assemblies for selectively supplying pressurized gas (e.g., air) thereto and selectively transferring pressurized gas therefrom. In the exemplary embodiment shown in FIG. 1, pressurized gas system 110 includes a pressurized gas source, such as a compressor 112, for example, for generating pressurized air or other gases. The pressurized gas system can also include any number of one or more control devices of any suitable type, kind and/or construction that may be capable of permitting and/or preventing the selective transfer of pressurized gas. For example, a valve assembly 114 is shown as being in communication with compressor 112 and can be of any suitable configuration or arrangement. In the exemplary embodiment shown, valve assembly 114 includes a valve block 116 with a plurality of valves 118 supported thereon. Valve assembly 114 can also optionally include a suitable exhaust, such as a muffler 120, for example, for venting pressurized gas from the system. Optionally, pressurized gas system 110 can also include a reservoir 122 in fluid communication with valve assembly 114 and suitable for storing pressurized gas.

The one or more control devices, such as valve assembly 114, for example, can be in communication with gas spring assemblies 102 in any suitable manner, such as, for example, through suitable gas transmission lines 124. As such, pressurized gas can be selectively transferred to and/or from the gas springs through valve assembly 114, such as to alter or maintain vehicle height at one or more corners of the vehicle, for example.

Suspension system 100 also includes a control system 126 that is capable of communication with any one or more other systems and/or components (not shown) of suspension system 100 and/or of vehicle VHC, and is capable of selective operation and control of the suspension system. Control system 126 includes a controller or electronic control unit (ECU) 128 in communication with compressor 112 and/or valve assembly 114, such as through a suitable conductor or lead 130, for example, for selective operation and control thereof, including supplying and exhausting pressurized fluid to and from any number of one or more gas spring assemblies, such as gas spring assemblies 102, for example. Additionally, it will be appreciated that controller 128 can be of any suitable type, kind and/or configuration.

Control system 126 can also optionally include one or more height or distance sensing devices (not shown) as well as any other desired systems and/or components. Such height sensors, if provided, are preferably capable of generating or otherwise outputting a signal having a relation to a height or distance, such as between spaced components of the vehicle, for example. It will be appreciated that any such optional height sensors or any other distance-determining devices, if provided, can be of any suitable type, kind, construction and/or configuration, such as mechanical linkage sensors, ultrasonic wave sensors or electromagnetic wave sensors, such as may operate using ultrasonic or electromagnetic waves, for example.

Having described an example of a suspension system (e.g., suspension system 100) that can include a gas spring assembly in accordance with the subject matter of the present disclosure, one example of such a gas spring assembly will now be described in connection with FIGS. 2-4. As shown therein, one example of a gas spring assembly 200, such as may be suitable for use as one of gas spring assemblies 102 in FIG. 1, for example, is shown as including a first end member, such as a top or bead plate 202, for example, and a second end member, such as a gas spring piston 204, for example, that is spaced from the first end member such that a longitudinal axis AX is at least partially formed therebetween. A flexible wall, such as a flexible sleeve 206, for example, is secured between bead plate 202 and piston 204 and at least partially forms a spring chamber 208 therebetween. Flexible sleeve 206 includes an upper mounting bead 210 and a lower mounting bead 212 formed along opposing ends thereof.

Upper mounting bead 210 of the flexible sleeve 206 is shown as being captured by the outer peripheral edge (not numbered) of bead plate 202. It will be appreciated that the peripheral edge can be deformed around the upper mounting bead in any manner suitable for forming a substantially fluid-tight seal therewith. Alternately, connection arrangements could be employed without departing from the subject matter of the present disclosure. One or more securement devices, such as mounting studs 214, for example, can be included along bead plate 202. In the exemplary embodiment shown in FIG. 2, mounting studs 214 project outwardly from bead plate 202 and are secured thereon in a suitable manner, such as, for example, by way of a flowed-material joint (not shown) or a press-fit connection (not identified). Such one or more securement devices may be suitable for securing the bead plate 202 on or along an associated structural member, such as by extending through holes HLS in an upper structural component USC of a vehicle and receiving one or more threaded nuts or other securement devices (not shown), for example. A fluid communication port, such as a fluid passage 216, for example, can optionally be provided to permit fluid communication with a spring chamber 208. In the exemplary embodiment shown, fluid passage 216 extends through at least one of studs 214 and is in fluid communication with spring chamber 208. However, it will be appreciated that any other suitable fluid communication arrangement could alternately be used.

A gas spring assembly according to the subject matter of the present disclosure includes a second end member that is spaced from the first end member and is operatively connected across an end of the flexible wall. As mentioned above, piston 204 is shown in FIGS. 2-4 as representing the second end member of gas spring assembly 200, which is shown as being of a rolling lobe-type construction. It will be appreciated, however, that other configurations and/or constructions could alternately be used. For example, a convoluted bellows-type construction could be used in which the second end member could have certain characteristics and/or features of a conventional top cap or a conventional bead plate, such as bead plate 202, for example.

If a gas spring piston is used, it will be appreciated that the mounting bead of the flexible wall (e.g., lower mounting bead 212) can be secured on the gas spring piston in any suitable manner. For example, although not illustrated in FIG. 2, the lower mounting bead of the flexible sleeve could be captured between an end closure and the piston in a conventional manner, and the end closure could be secured on the piston assembly using a suitable securement device or assembly, such as a mounting stud and nut, for example. Alternately, piston 204 can include a bead mounting wall 218 that is adapted to receive and retain lower mounting bead 212, such as is shown in FIGS. 2-4, for example.

Additionally, it will be appreciated that gas spring pistons of a wide variety of sizes, shapes and configurations have been developed and that the specific configuration illustrated herein is merely exemplary. In FIGS. 2-4, gas spring piston 204 is shown as including an outer side wall 220 that extends generally longitudinally from a first end 222 that is disposed toward bead mounting wall 218 to a second end 224 that is adjacent a base wall 226, which is disposed transverse to axis AX. In use as a component of gas spring assembly 200, a portion of flexible sleeve 206 forms a rolling-lobe 228 that is displaced along outer side wall 220 as the gas spring assembly undergoes changes in overall height, such as, for example, may be due to variations in load conditions applied thereto, as is well understood by those of skill in the art. It will be recognized that a wide variety of shapes, profiles and/or configurations can and have been used in forming the first or outer side wall of gas spring pistons. As such, it will be appreciated that the profile of first side wall 220 is merely exemplary.

Figure 2:
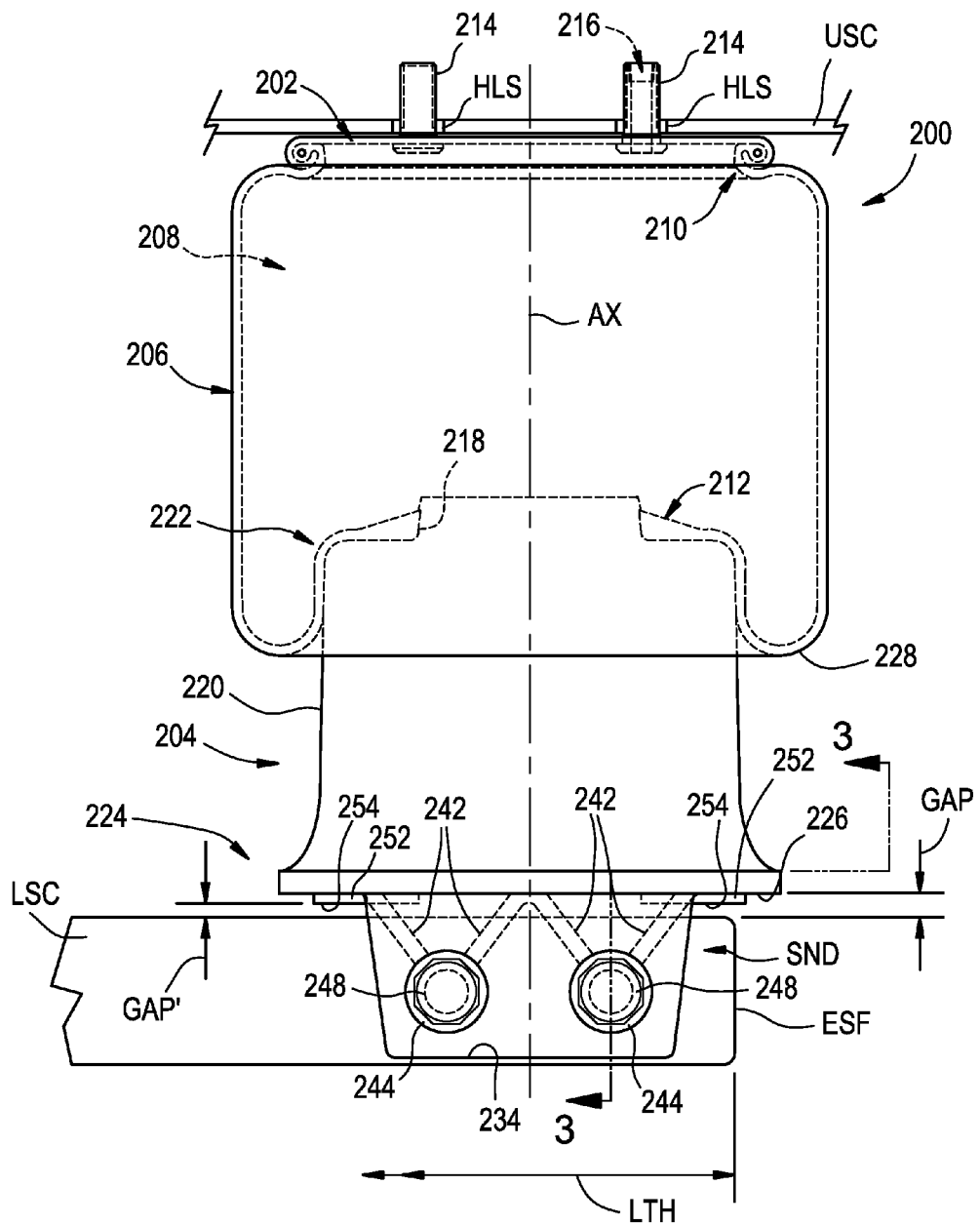
FIG. 2 is a side view of one example of a gas spring assembly in accordance with the subject matter of the present disclosure shown assembled on an associated structural component.
Figure 3:
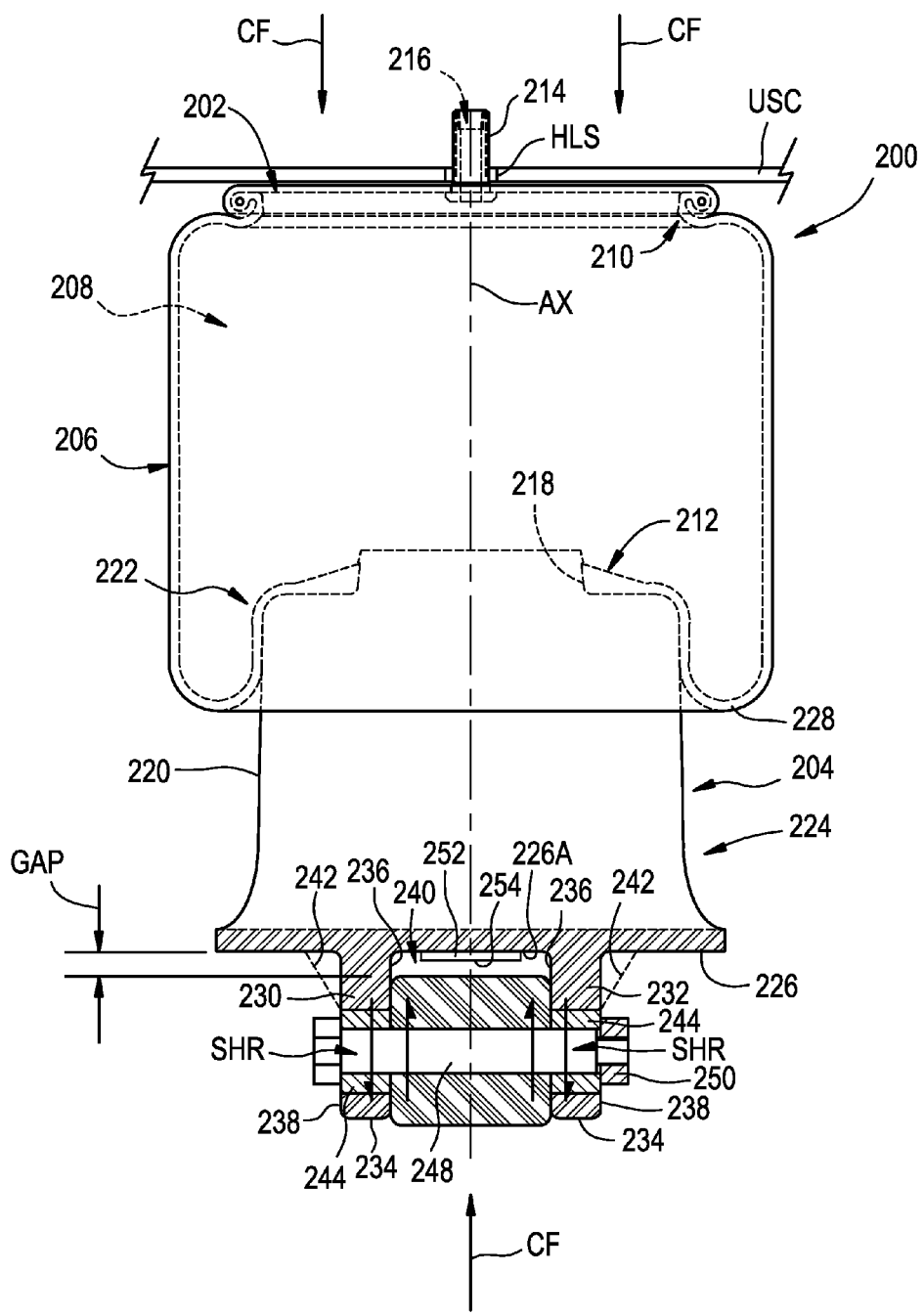
FIG. 3 is an end view of the exemplary gas spring assembly in FIG. 2 shown in partial cross-section, which is taken from along line 3-3 in FIG. 2.
Figure 4:
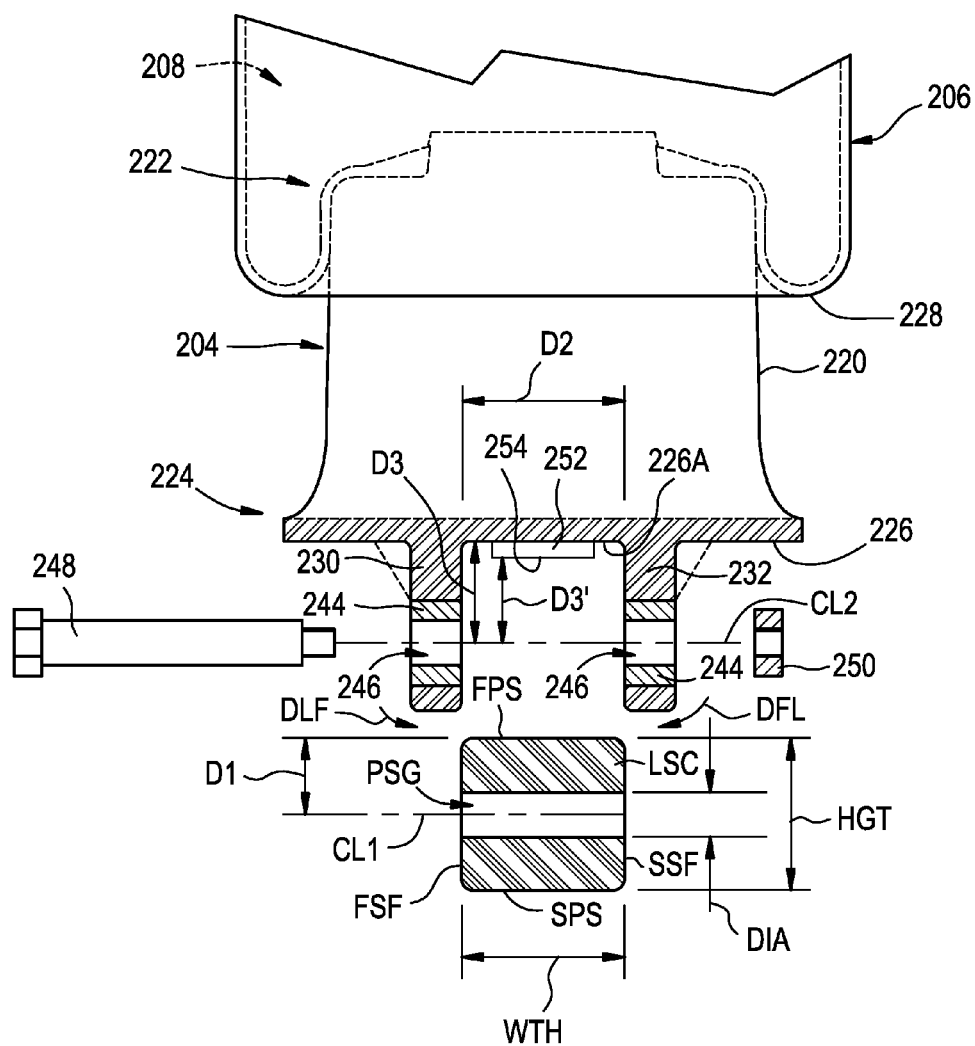
FIG. 4 an exploded version of the end view of the exemplary gas spring assembly shown in FIG. 3 prior to assembly on the associated structural component.

The second end member of a gas spring assembly in accordance with the subject matter of the present disclosure is supported on an associated structural member, such as is represented in FIGS. 2-4 by a lower structural component LSC, for example. It will be appreciated that the associated structural component can be of any suitable size, shape, configuration and/or construction. Additionally, it will be recognized that lower structural component LSC can be representative of any suitable structural component, such as of a vehicle suspension or other support structure, for example. As one example, lower structural component LSC can be representative of one of trailing arms 108 in FIG. 1. In such case, lower structural component LSC can be of an elongated length, which is represented in FIG. 2 by reference dimension LTH, and extend between a first end (not shown) that is operatively connected to one of rear wheel-engaging members 106 and a second end SND that is distal to the rear wheel-engaging member. Lower structural component LSC can terminate along second end SND at an end surface ESF.

The lower structural component can also include a first side surface FSF and a second side surface SSF that is opposite the first side surface and spaced apart therefrom such that a component width is at least partially defined therebetween, as is represented in FIG. 4 by reference dimension WTH. The lower structural component can further include a first or upper planar surface FPS and a second or lower planar surface SPS that is opposite the first planar surface and spaced apart therefrom such that a component height is at least partially defined therebetween, as is represented in FIG. 4 by reference dimension HGT.

Additionally, lower structural component LSC can include one or more passages PSG extending widthwise therethrough between first and second side surfaces FSF and SSF. Passages PSG extend generally transverse to longitudinal axis AX and can include a centerline CL1 extending therethrough. The one or more passages are positioned in spaced relation to first and second planar surfaces FPS and SPS, as is represented in FIG. 4 by referenced dimension D1. If two or more passages PSG are provided, the passages may be of a common size or of two or more different sizes. In the exemplary arrangement shown in FIG. 4, passage PSG is substantially cylindrical in shape and has a cross-sectional diameter that is represented by reference dimension DIA.

The second end member of a gas spring assembly in accordance with the subject matter of the present disclosure is adapted for securement on or along the associated structural member such that a base surface of the second end member can be supported in spaced apart relation to a corresponding upper or planar surface of the associated structural member that is facing the base surface. In this manner, a gap or space can be maintained between the base surface of the second end member and the planar surface of the associated structural member such that the base surface can be substantially free from contact with the corresponding planar surface. The gap or space may be suitable accommodating variations in the size, shape and/or surface condition of the associated structural member, such as, for example, may be due to the surface finish and/or dimensional tolerance of the planar surface.

In some cases, it may be possible that displacement of the second end member and the associated structural member may occur, such as may be due to deflection of one or more portions of the second end member and/or the associated structural member. As such, an end member in accordance with the subject matter of the present disclosure can, optionally, include one or more support projections that extend from the second end member toward the associated structural member to provide an initial point of contact and support in the event of such deflection.

One manner in which the second end member of a gas spring assembly in accordance with the subject matter of the present disclosure can be secured on or along an associated structural member such that the base surface of the second end member can be supported in spaced apart relation to a corresponding planar surface of the associated structural member is by including one or more bracket walls on the second end member. The one or more bracket walls can extend longitudinally outwardly beyond the base surface of the second end member in a direction opposite the first end member. One or more associated securement devices or elements can be used to operatively interconnect the one or more bracket walls with the associated structural member such that an axial force (which is represented as a compressive force by arrows CF in FIG. 3) acting on the gas spring assembly in a substantially longitudinal direction will primarily result in the one or more bracket walls generating shear forces (which are represented by arrows SHR in FIG. 3) in the associated securement element.

In the exemplary arrangement shown in FIGS. 2-4, the second end member includes a plurality of bracket walls that are spaced apart from one another and at least partially define a channel for receiving at least a portion of the associated structural member. More specifically, piston 204 includes a first bracket wall 230 and a second bracket wall 232 that is spaced apart from the first bracket wall. The first and second bracket walls project longitudinally-outwardly beyond base wall 226 toward distal end surfaces 234. The first and second bracket walls extend in a lengthwise direction (which is transverse to axis AX) across base wall 226 and include an inboard surface 236 and an outboard surface 238 opposite the inboard surface. In the embodiment shown in FIGS. 2-4, inboard surfaces 236 and base wall portion 226A together at least partially define a recess or channel 240 that extends lengthwise across base wall 226 and is dimensioned to at least partially receive the associated structural member (e.g., lower structural component LSC). Inboard surfaces 236 can be spaced apart from one another a distance sufficient to at least partially receive lower structural component LSC within channel 240, which distance is represented in FIG. 4 by reference dimension D2. In one exemplary arrangement, distance D2 can be greater than width WTH of lower structural component LSC such that the lower structural component can be received within channel 240 with clearance from the inboard surfaces along at least one of side surfaces FSF and SSF.

Bracket walls 230 and 232 can be of any size, shape, configuration and/or arrangement suitable for supporting at least a portion of base wall 226 in spaced relation to a facing planar surface (e.g., first planar surface FPS) of the associated structural member. As one example, inboard surfaces 236 can extend from along base wall 226 (or another portion of piston 204) at a non-zero angle relative to one another, such as, for example, at an angle within a range of from approximately 0.5 degrees to approximately 45 degrees. As another example, which is shown in FIGS. 3 and 4, inboard surfaces 236 can extend from along base wall 226 (or another portion of piston 204) in approximate alignment with one another (e.g., parallel to one another).

Additionally, outboard surfaces 238 of bracket walls 230 and 232 can include any suitable combination of features and/or elements for supporting at least a portion of base wall 226 in spaced relation to a facing planar surface (e.g., first planar surface FPS) of the associated structural member. In addition to the transmission of longitudinally-acting forces between the associated structural member and the gas spring assembly, bracket walls 230 and 232 can also incur forces associated with lateral load conditions between the sprung and unsprung masses that may be transferred through the gas spring assembly. Accordingly, bracket walls 230 and 232 can optionally include one or more additional features and/or elements. For example, one or more gusset walls can extend between the bracket walls and the base wall of the piston. In the exemplary arrangement shown, a plurality of gusset walls 242 extend from along outboard surfaces 238 and operatively interconnect with base wall 226.

Piston 204 can be formed from any suitable material or combination of materials, such as metal (e.g., aluminum) or polymeric material (e.g., polyamide). It will be appreciated that, in some cases, the overall configuration and arrangement of piston 204 may be well suited for certain plastic manufacturing processes, such as injection molding, for example. In such case, bracket walls 230 and 232 can optionally include one or more connection elements that are rigidly affixed on or along the bracket walls. As one example, a plurality of metal bushings 244 could be at least partially embedded into the bracket walls, such as by over-molding the bushings during an injection molding operation, for example. Bushings 244, if included, can include a passage or opening 246 (FIG. 4) formed therethrough that is suitable for receiving an associated securement device or element, such as a pin, rod or threaded fastener, for example. If bushings or other connection elements are not used, a passage or opening (not shown) through the bracket walls can be provided.

If provided, two of bushings 244 are preferably positioned as a set along bracket walls 230 and 232 such that openings 246 are at least approximately aligned with one another along a centerline CL2 (FIG. 4). Optionally, two or more sets of bushings 244 can be used, such as is shown in FIG. 2 by positioning first and second sets of bushings in spaced-apart relation to one another in the lengthwise direction along the bracket walls. Additionally, bushings 244 are positioned along the bracket walls such that centerline CL2 is spaced away from base wall portion 226A, as is represented in FIG. 4 by reference dimension D3. In a preferred arrangement, dimension D3 is greater than dimension D1 such that gap GAP can be formed and maintained when the second end member (e.g., piston 204) is assembled together with the associated structural member (e.g., lower structural component LSC).

The associated securement device or element that is used in shear to support the second end member in spaced relation to the associated structural member and to secure the second end member on or along the same can be of any suitable type, kind, configuration and/or construction suitable for withstanding the shear loads associated with the subject design and retaining the second end member on or along the associated structural member. As mentioned above, components such as pins and rods with appropriate retention features could be used. As shown in FIGS. 2-4, a threaded fastener 248, such as a shoulder bolt, for example, can be used and can extend through openings 246 and passage PSG. A corresponding threaded nut 250 is shown as threadably engaging fastener 248 to secure and retain the fastener within the openings and passage. Additionally, threaded nut 250 can be used to tension fastener 248 by compressing lower structural member LSC between bushings 244 such that an inner surface of the bushings (not numbered) abuttingly engages one of the side surfaces of the lower structural member. In some cases, channel 240 may have a greater width dimension (e.g., dimension D2) than that of the lower structural component (e.g., width WTH), such as to accommodate variations in the size, shape and/or configuration of the lower structural component. In such case, tensioning fastener 248, as described above, can cause the bracket walls to deflect inwardly, such as is represented by arrows DFL in FIG. 4, and thereby securely engage the lower structural component.

As shown in FIGS. 2-4, piston 204 can, optionally, include one or more support projections 252 that extend from along base wall 226, such as from along base wall portion 226A, for example, in a direction toward lower structural component LSC from which base wall 226 is spaced. Support projection 252 can extend from the base wall and terminate at an end surface 254 that is spaced a predetermined distance from centerline CL2, which distance is represented in FIG. 3 by dimension D3'. In a preferred arrangement, dimension D3' is greater than dimension D1 such that a gap GAP' (FIG. 2) is formed and maintained when the second end member (e.g., piston 204) is assembled together with the associated structural member (e.g., lower structural component LSC). If provided, it will be appreciated that the support projections can be of any suitable size, shape, form, configuration and/or arrangement, such as by being formed from one or more ribs, rings or posts that project from the base wall in a pattern suitable for forming a support projection. Additionally, support projections 252 are shown as being spaced apart from one another in a lengthwise direction along the associated structural member, and positioned in approximate alignment with axis AX (i.e., centrally along piston 204). Furthermore, the one or more support projections are preferably integrally formed on or along the base wall of the piston, such as by molding or casting, for example.

Figure 5:
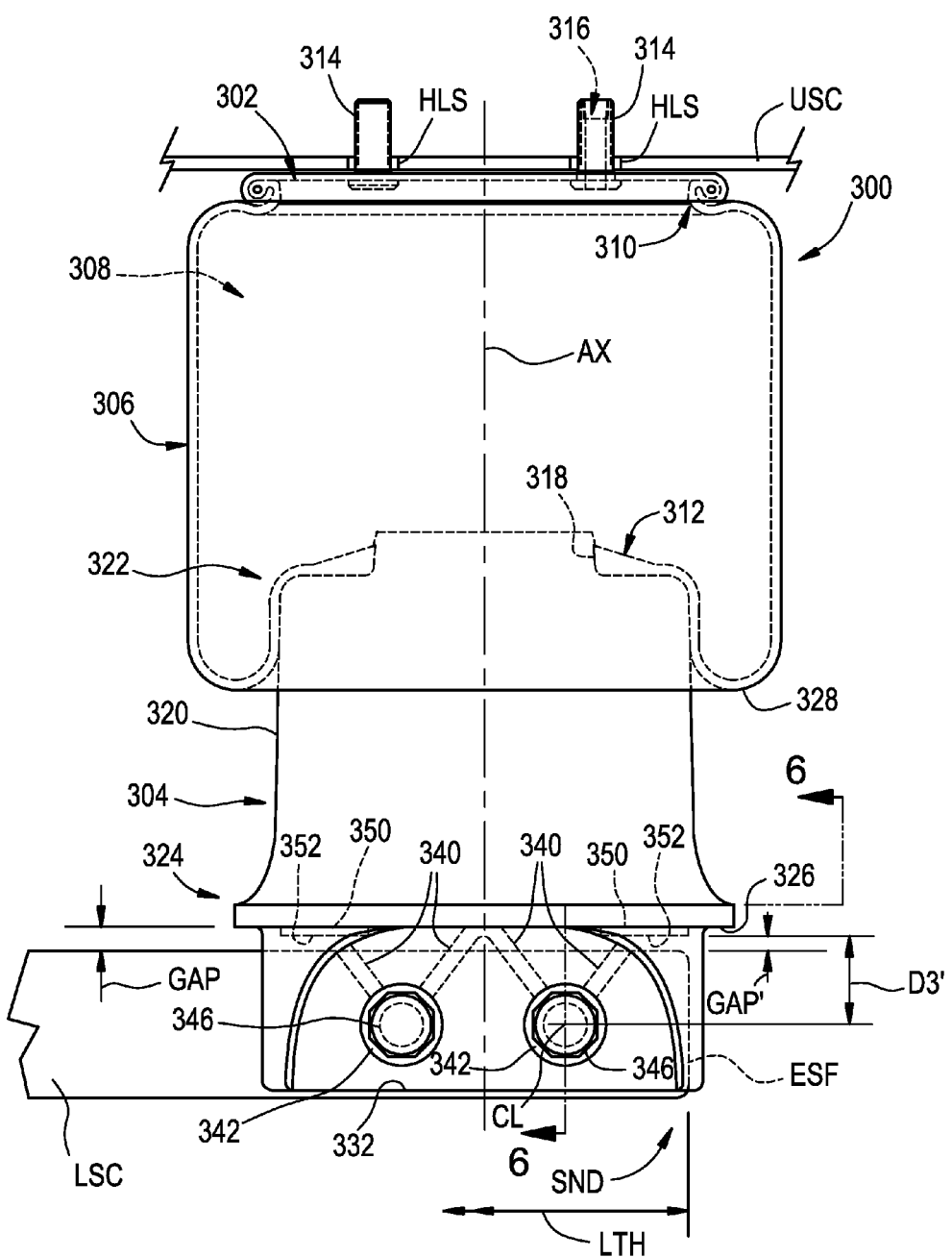
FIG. 5 is a side view of another example of a gas spring assembly in accordance with the subject matter of the present disclosure shown assembled on an associated structural component.
Figure 6:
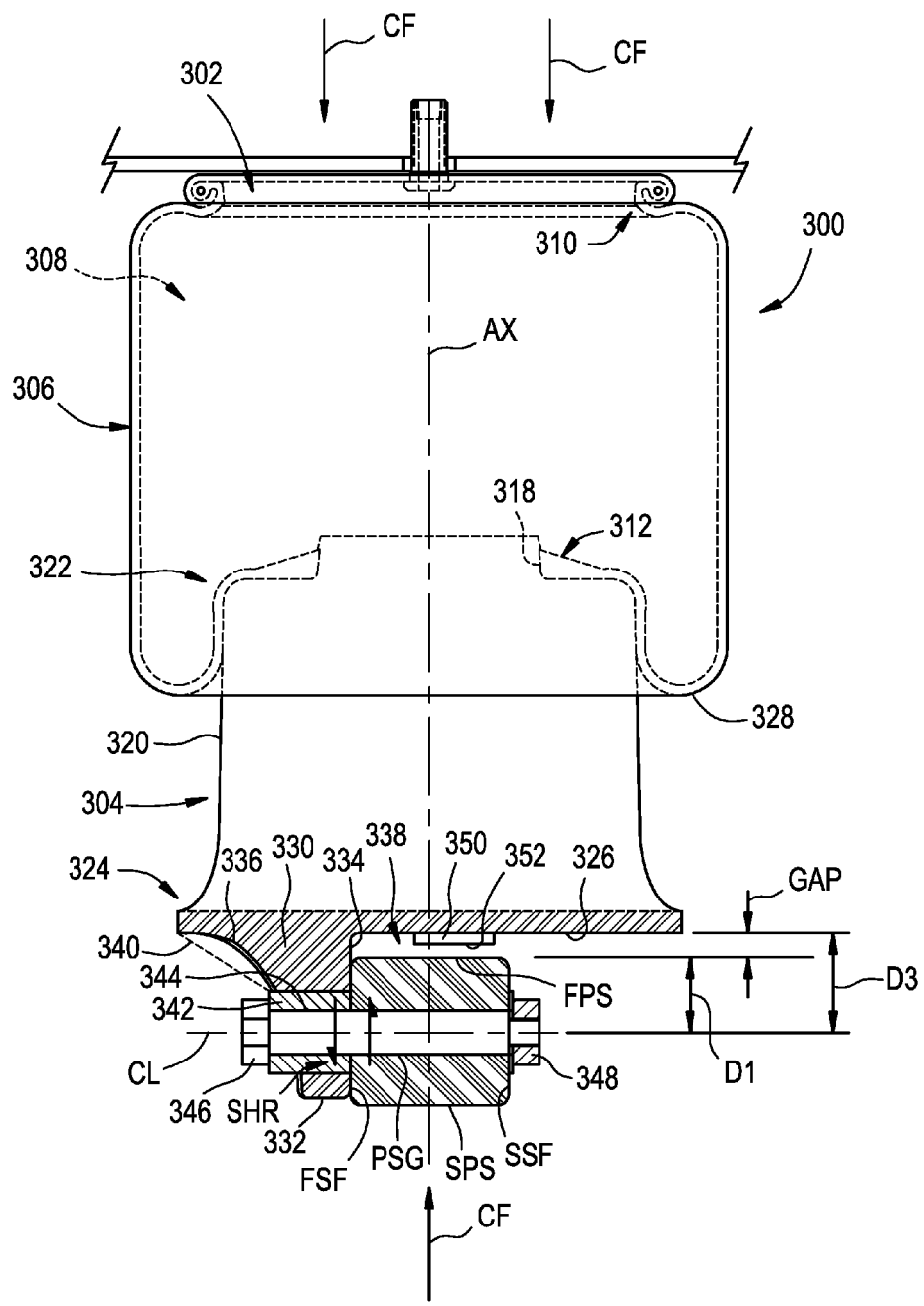
FIG. 6 is an end view of the exemplary gas spring assembly in FIG. 5 shown in partial cross-section, which is taken from along line 6-6 in FIG. 5.

Another example of a gas spring assembly 300, such as may be suitable for use as one of gas spring assemblies 102 in FIG. 1, for example, is shown in FIGS. 5 and 6 as including a first end member, such as a top or bead plate 302, for example, and a second end member, such as a gas spring piston 304, for example, that is spaced from the first end member such that a longitudinal axis AX is at least partially formed therebetween. A flexible wall, such as a flexible sleeve 306, for example, is secured between bead plate 302 and piston 304 and at least partially forms a spring chamber 308 therebetween. Flexible sleeve 306 includes an upper mounting bead 310 and a lower mounting bead 312 formed along opposing ends thereof.

Upper mounting bead 310 of the flexible sleeve 306 is shown as being captured by the outer peripheral edge (not numbered) of bead plate 302. It will be appreciated that the peripheral edge can be deformed around the upper mounting bead in any manner suitable for forming a substantially fluid-tight seal therewith. Alternately, other connection arrangements could be employed without departing from the subject matter of the present disclosure. One or more securement devices, such as mounting studs 314, for example, can be included along bead plate 302. In the exemplary embodiment shown in FIGS. 5 and 6, mounting studs 314 project outwardly from the bead plate 302 and are secured thereon in a suitable manner, such as, for example, by way of a flowed-material joint (not shown) or a press-fit connection (not identified). Such one or more securement devices may be suitable for securing bead plate 302 on or along an associated structural member, such as by extending through holes HLS in an upper structural component USC of a vehicle and receiving one or more threaded nuts or other securement devices (not shown), for example. A fluid communication port, such as a fluid passage 316, for example, can optionally be provided to permit fluid communication with a spring chamber 308. In the exemplary embodiment shown, fluid passage 316 extends through at least one of studs 314 and is in fluid communication with spring chamber 308. However, it will be appreciated that any other suitable fluid communication arrangement could alternately be used.

A gas spring assembly according to the subject matter of the present disclosure includes a second end member that is spaced from the first end member and is operatively connected across an end of the flexible wall. As mentioned above, piston 304 is shown in FIGS. 5 and 6 as representing the second end member of gas spring assembly 300, which is shown as being of a rolling lobe-type construction. It will be appreciated, however, that other configurations and/or constructions could alternately be used. For example, a convoluted bellows-type construction could be used in which the second end member could have certain characteristics and/or features of a conventional top cap or a conventional bead plate, such as bead plate 302, for example.

If a gas spring piston is used, it will be appreciated that the mounting bead of the flexible wall (e.g., lower mounting bead 312) can be secured on the gas spring piston in any suitable manner. For example, although not illustrated in FIG. 5 or 6, the lower mounting bead of the flexible sleeve could be captured between an end closure and the piston in a conventional manner, and the end closure could be secured on the piston assembly using a suitable securement device or assembly, such as a mounting stud and nut, for example. Alternately, piston 304 can include a bead mounting wall 318 that is adapted to receive and retain lower mounting bead 312, such as is shown in FIGS. 5 and 6, for example.

Additionally, it will be appreciated that gas spring pistons of a wide variety of sizes, shapes and configurations have been developed and that the specific configuration illustrated herein is merely exemplary. In FIGS. 5 and 6, gas spring piston 304 is shown as including an outer side wall 320 that extends generally longitudinally from a first end 322 that is disposed toward bead mounting wall 318 to a second end 324 that is adjacent a base wall 326, which is disposed transverse to axis AX. In use as a component of gas spring assembly 300, a portion of flexible sleeve 306 forms a rolling-lobe 328 that is displaced along outer side wall 320 as the gas spring assembly undergoes changes in overall height, such as, for example, may be due to variations in load conditions applied thereto, as is well understood by those of skill in the art. It will be recognized that a wide variety of shapes, profiles and/or configurations can and have been used in forming the first or outer side wall of gas spring pistons. As such, it will be appreciated that the profile of first side wall 320 is merely exemplary.

As discussed above, the second end member of a gas spring assembly in accordance with the subject matter of the present disclosure is supported on an associated structural member, such as is represented in FIGS. 5 and 6 by lower structural component LSC, for example. Additionally, as discussed above, it will be recognized that the embodiment of lower structural component LSC shown in FIGS. 5 and 6 is merely exemplary, and this exemplary embodiment of the lower structural component has been described in detail above. As such, a description of lower structural component LSC is not repeated here. However, it will be understood that like reference characters to those shown in FIGS. 2-4 are used in FIGS. 5 and 6.

As has also been discussed above in detail, the second end member of a gas spring assembly in accordance with the subject matter of the present disclosure is adapted for securement on or along the associated structural member such that a base surface of the second end member can be supported in spaced apart relation to a corresponding upper or planar surface of the associated structural member that is facing the base surface. In this manner, a gap or space can be maintained between the base surface of the second end member and the planar surface of the associated structural member such that the base surface can be substantially free from contact with the corresponding planar surface. The gap or space may be suitable accommodating variations in the size, shape and/or surface condition of the associated structural member, such as, for example, may be due to the surface finish and/or dimensional tolerance of the planar surface.

One manner in which the second end member of a gas spring assembly in accordance with the subject matter of the present disclosure can be secured on or along an associated structural member such that the base surface of the second end member can be supported in spaced apart relation to a corresponding planar surface of the associated structural member is by including one or more bracket walls on the second end member. The one or more bracket walls can extend longitudinally outwardly beyond the base surface of the second end member in a direction opposite the first end member. One or more associated securement devices or elements can be used to operatively interconnect the one or more bracket walls with the associated structural member such that an axial force (which is represented as a compressive force by arrows CF in FIG. 6) acting on the gas spring assembly in a substantially longitudinal direction will primarily result in the one or more bracket walls generating shear forces (which are represented by arrows SHR in FIG. 6) in the associated securement element.

The second end member shown in FIGS. 5 and 6 differs from the configuration shown in FIGS. 2-4 in that the embodiment in FIGS. 5 and 6 includes a single bracket wall that at least partially defines a channel for receiving at least a portion of the associated structural member. More specifically, piston 304 includes a first bracket wall 330 that project longitudinally-outwardly beyond base wall 326 toward distal end surface 332. The first bracket wall extends in a lengthwise direction (which is transverse to axis AX) across base wall 326 and includes an inboard surface 334 and an outboard surface 336 opposite the inboard surface. In the embodiment shown in FIGS. 5 and 6, inboard surface 334 and base wall 326 together at least partially define a recess or channel 338 that extends lengthwise across base wall 326 and is dimensioned to at least partially receive the associated structural member (e.g., lower structural component LSC). In some cases, inboard surface 334 can be positioned along base wall 326 such that gas spring assembly 300 will be approximately centered on or along the associated structural member when inboard surface is in abutting engagement with one of side surfaces FSF and SSF, such as is shown in FIG. 6, for example. In other cases, however, the inboard surface can be positioned along the base wall such that an offset mounting arrangement can be achieved.

Bracket wall 330 can be of any size, shape, configuration and/or arrangement suitable for supporting at least a portion of base wall 326 in spaced relation to a facing planar surface (e.g., first planar surface FPS) of the associated structural member. As one example, inboard surface 334 can extend from along base wall 326 (or another portion of piston 204) in approximate alignment with longitudinal axis AX (e.g., parallel to axis AX). Additionally, outboard surface 336 of bracket wall 330 can include any suitable combination of features and/or elements for supporting at least a portion of base wall 326 in spaced relation to a facing planar surface (e.g., first planar surface FPS) of the associated structural member. In addition to the transmission of longitudinally-acting forces between the associated structural member and the gas spring assembly, bracket wall 330 can also incur forces associated with lateral load conditions between the sprung and unsprung masses that may be transferred through the gas spring assembly. Accordingly, bracket wall 330 can optionally include one or more additional features and/or elements. For example, one or more gusset walls can extend between the bracket walls and the base wall of the piston. In the exemplary arrangement shown, a plurality of gusset walls 340 extend from along outboard surface 336 and operatively interconnect with base wall 326.

Piston 304 can be formed from any suitable material or combination of materials, such as metal (e.g., aluminum) or polymeric material (e.g., polyamide). It will be appreciated that, in some cases, the overall configuration and arrangement of piston 304 may be well suited for certain plastic manufacturing processes, such as injection molding, for example. In such case, bracket wall 330 can optionally include one or more connection elements that are rigidly affixed on or along the bracket walls. As one example, a plurality of metal bushings 342 could be at least partially embedded into the bracket wall, such as by over-molding the bushings during an injection molding operation, for example. Bushings 342, if included, can include a passage or opening 344 (FIG. 6) formed therethrough that is suitable for receiving an associated securement device or element, such as a pin, rod or threaded fastener, for example. If bushings or other connection elements are not used, a passage or opening (not shown) through the bracket walls can be provided.

If provided, bushings 342 can be positioned in spaced-apart relation to one another in the lengthwise direction along the bracket wall, such as is shown in FIG. 5, for example. Additionally, bushings 342 are preferably positioned along the bracket wall such that a centerline CL is spaced away from base wall portion 326, as is represented in FIG. 6 by reference dimension D3. In a preferred arrangement, dimension D3 is greater than dimension D1 such that gap GAP can be formed and maintained when the second end member (e.g., piston 304) is assembled together with the associated structural member (e.g., lower structural component LSC).

The associated securement devices or elements that are used to support the second end member in spaced relation to the associated structural member and to secure the second end member on or along the same can be of any suitable type, kind, configuration and/or construction suitable for withstanding the shear loads associated with the subject design and retaining the second end member on or along the associated structural member. As mentioned above, components such as pins and rods with appropriate retention features could be used. As shown in FIGS. 5 and 6, a threaded fastener 346, such as a shoulder bolt, for example, can be used and can extend through openings 344 and passage PSG of lower structural component LSC. A corresponding threaded nut 348 is shown as threadably engaging fastener 346 to secure and retain the fastener within the openings and passage.

Additionally, threaded nut 348 can be used to tension fastener 346 by compressing lower structural component LSC between bushings 342 and the threaded nuts such that an inner surface of the bushings (not numbered) abuttingly engages one of the side surfaces of the lower structural member. Tensioning fastener 346, as described above, can cause the bracket wall and/or the lower structural component to deflect and/or otherwise cooperatively conform to one another, and thereby securely engage the second end member and the associated structural component to one another.

As shown in FIGS. 5 and 6, piston 304 can, optionally, include one or more support projections 350 that extend from along base wall 326 in a direction toward lower structural component LSC from which base wall 326 is spaced. Support projection 350 can extend from the base wall and terminate at an end surface 352 that is spaced a predetermined distance from centerline CL, which distance is represented in FIG. 5 by dimension D3'. In a preferred arrangement, dimension D3' is greater than dimension D1 such that a gap GAP' is formed and maintained when the second end member (e.g., piston 304) is assembled together with the associated structural member (e.g., lower structural component LSC). If provided, it will be appreciated that the support projections can be of any suitable size, shape, form, configuration and/or arrangement, such as by being formed from one or more ribs, rings or posts that project from the base wall in a pattern suitable for forming a support projection. Additionally, support projections 350 are shown as being spaced apart from one another in a lengthwise direction along the associated structural member, and positioned in an offset alignment with respect to axis AX. Furthermore, the one or more support projections are preferably integrally formed on or along the base wall of the piston, such as by molding or casting, for example.

Figure 7:
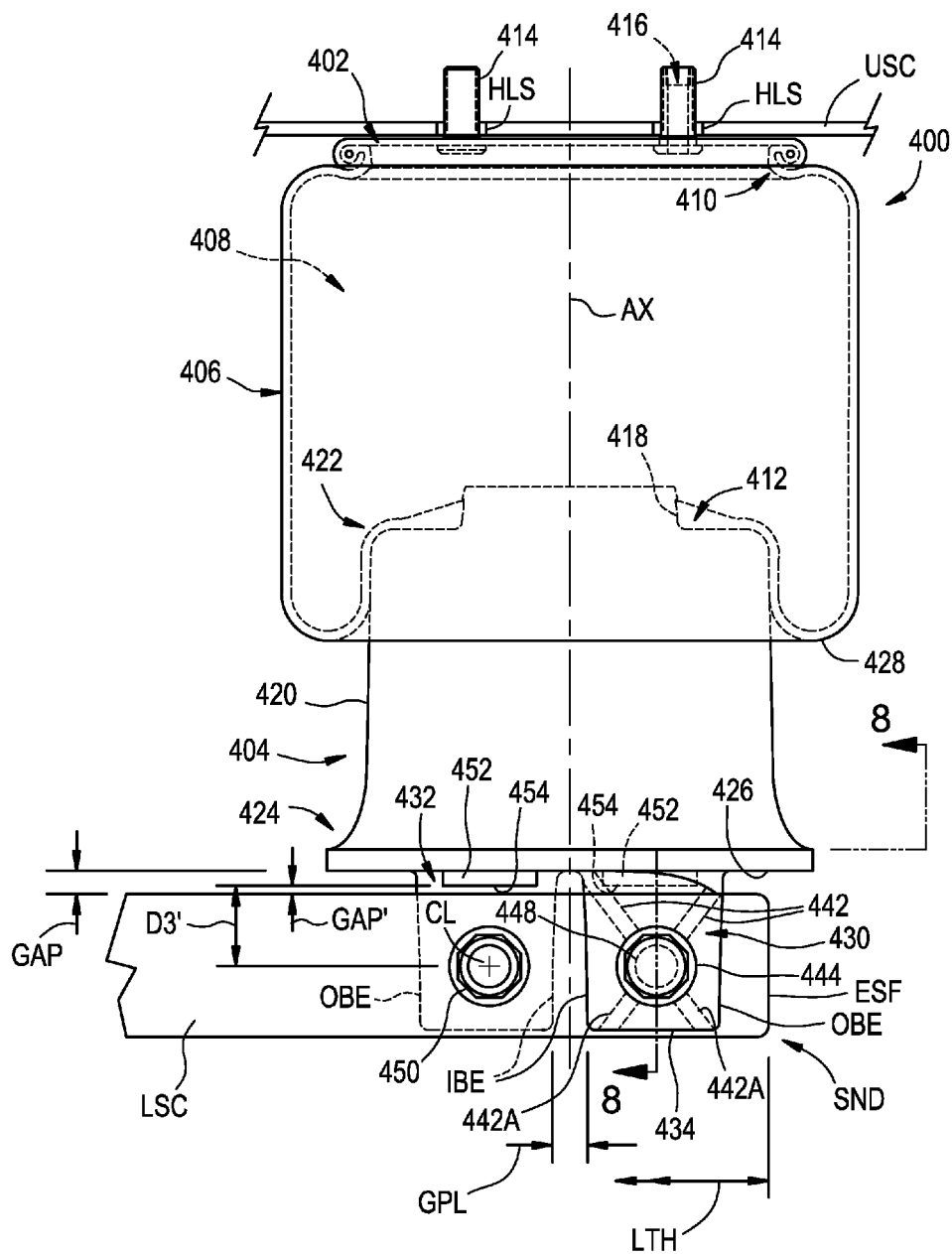
FIG. 7 is a side view of a further example of a gas spring assembly in accordance with the subject matter of the present disclosure shown assembled on an associated structural component.
Figure 8:
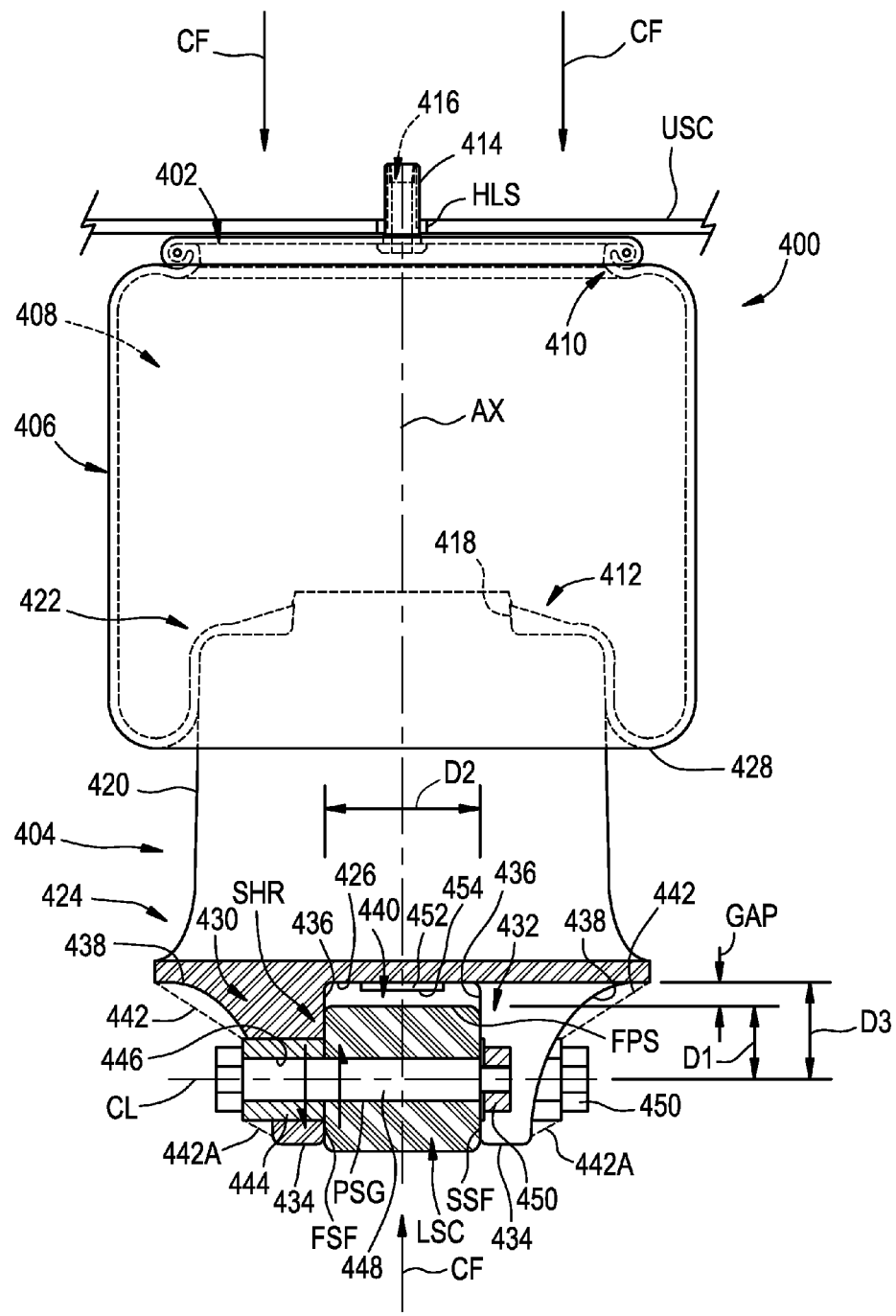
FIG. 8 is an end view of the exemplary gas spring assembly in FIG. 7 shown in partial cross-section, which is taken from along line 8-8 in FIG. 7.
Figure 9:
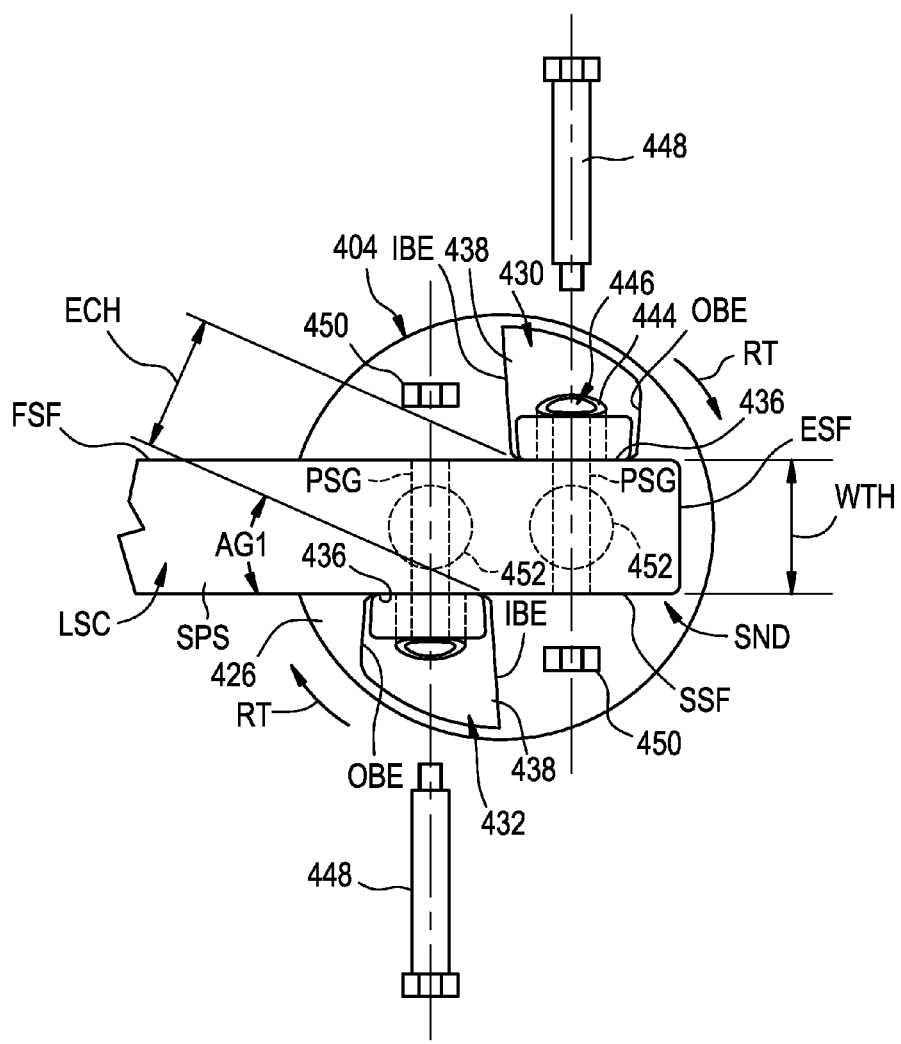
FIG. 9 is a bottom plan view of the exemplary gas spring assembly in FIGS. 7 and 8 shown partially assembled on the associated structural component.

A further example of a gas spring assembly 400, such as may be suitable for use as one of gas spring assemblies 102 in FIG. 1, for example, is shown in FIGS. 7-9 as including a first end member, such as a top or bead plate 402, for example, and a second end member, such as a gas spring piston 404, for example, that is spaced from the first end member such that a longitudinal axis AX is at least partially formed therebetween. A flexible wall, such as a flexible sleeve 406, for example, is secured between bead plate 402 and piston 404 and at least partially forms a spring chamber 408 therebetween. Flexible sleeve 406 includes an upper mounting bead 410 and a lower mounting bead 412 formed along opposing ends thereof.

Upper mounting bead 410 of the flexible sleeve 406 is shown as being captured by the outer peripheral edge (not numbered) of bead plate 402. It will be appreciated that the peripheral edge can be deformed around the upper mounting bead in any manner suitable for forming a substantially fluid-tight seal therewith. Alternately, other connection arrangements could be employed without departing from the subject matter of the present disclosure. One or more securement devices, such as mounting studs 414, for example, can be included along bead plate 402. In the exemplary embodiment shown in FIGS. 7 and 8, mounting studs 414 project outwardly from bead plate 402 and are secured thereon in a suitable manner, such as, for example, by way of a flowed-material joint (not shown) or a press-fit connection (not identified). Such one or more securement devices may be suitable for securing the bead plate 402 on or along an associated structural member, such as by extending through holes HLS in an upper structural component USC of a vehicle and receiving one or more threaded nuts or other securement devices (not shown), for example. A fluid communication port, such as a fluid passage 416, for example, can optionally be provided to permit fluid communication with a spring chamber 408. In the exemplary embodiment shown, fluid passage 416 extends through at least one of studs 414 and is in fluid communication with spring chamber 408. However, it will be appreciated that any other suitable fluid communication arrangement could alternately be used.

A gas spring assembly according to the subject matter of the present disclosure includes a second end member that is spaced from the first end member and is operatively connected across an end of the flexible wall. As mentioned above, piston 404 is shown in FIGS. 7-9 as representing the second end member of gas spring assembly 400, which is shown as being of a rolling lobe-type construction. It will be appreciated, however, that other configurations and/or constructions could alternately be used. For example, a convoluted bellows-type construction could be used in which the second end member could have certain characteristics and/or features of a conventional top cap or a conventional bead plate, such as bead plate 402, for example.

If a gas spring piston is used, it will be appreciated that the mounting bead of the flexible wall (e.g., lower mounting bead 412) can be secured on the gas spring piston in any suitable manner. For example, although not illustrated in FIGS. 7-9, the lower mounting bead of the flexible sleeve could be captured between an end closure and the piston in a conventional manner, and the end closure could be secured on the piston assembly using a suitable securement device or assembly, such as a mounting stud and nut, for example. Alternately, piston 404 can include a bead mounting wall 418 that is adapted to receive and retain lower mounting bead 412, such as is shown in FIGS. 7 and 8, for example.

Additionally, it will be appreciated that gas spring pistons of a wide variety of sizes, shapes and configurations have been developed and that the specific configuration illustrated herein is merely exemplary. In FIGS. 7 and 8, gas spring piston 404 is shown as including an outer side wall 420 that extends generally longitudinally from a first end 422 that is disposed toward bead mounting wall 418 to a second end 424 that is adjacent a base wall 426, which is disposed transverse to axis AX. In use as a component of gas spring assembly 400, a portion of flexible sleeve 406 forms a rolling-lobe 428 that is displaced along outer side wall 420 as the gas spring assembly undergoes changes in overall height, such as, for example, may be due to variations in load conditions applied thereto, as is well understood by those of skill in the art. It will be recognized that a wide variety of shapes, profiles and/or configurations can and have been used in forming the first or outer side wall of gas spring pistons. As such, it will be appreciated that the profile of first side wall 420 is merely exemplary.

As discussed above, the second end member of a gas spring assembly in accordance with the subject matter of the present disclosure is supported on an associated structural member, such as is represented in FIGS. 7-9 by lower structural component LSC, for example. Additionally, as discussed above, it will be recognized that the embodiment of lower structural component LSC shown in FIGS. 7-9 is merely exemplary, and this exemplary embodiment of the lower structural component has been described in detail above. As such, a description of lower structural component LSC is not repeated here. However, it will be understood that like reference characters to those shown in FIGS. 2-4 are used in FIGS. 7-9.

As has also been discussed above in detail, the second end member of a gas spring assembly in accordance with the subject matter of the present disclosure is adapted for securement on or along the associated structural member such that a base surface of the second end member can be supported in spaced apart relation to a corresponding planar surface of the associated structural member that is facing the base surface. In this manner, a gap or space can be maintained between the base surface of the second end member and the planar surface of the associated structural member such that the base surface can be substantially free from contact with the corresponding planar surface. The gap or space may be suitable accommodating variations in the size, shape and/or surface condition of the associated structural member, such as, for example, may be due to the surface finish and/or dimensional tolerance of the planar surface.

One manner in which the second end member of a gas spring assembly in accordance with the subject matter of the present disclosure can be secured on or along an associated structural member such that the base surface of the second end member can be supported in spaced apart relation to a corresponding planar surface of the associated structural member is by including one or more bracket walls on the second end member. The one or more bracket walls can extend longitudinally outwardly beyond the base surface of the second end member in a direction opposite the first end member. One or more associated securement devices or elements can be used to operatively interconnect the one or more bracket walls with the associated structural member such that an axial force (which is represented as a compressive force by arrows CF in FIG. 8) acting on the gas spring assembly in a substantially longitudinal direction will primarily result in the one or more bracket walls generating shear forces (which are represented by arrows SHR in FIG. 8) in the associated securement element.

In the exemplary arrangement shown in FIGS. 7-9, the second end member includes a plurality of bracket walls that are spaced apart from one another and at least partially define a channel for receiving at least a portion of the associated structural member. More specifically, piston 404 includes a first bracket wall 430 and a second bracket wall 432 that is spaced apart from the first bracket wall. The first and second bracket walls project longitudinally-outwardly beyond base wall 426 toward distal end surfaces 434. The first and second bracket walls are also spaced apart in a lengthwise direction (which is transverse to axis AX) across base wall 426 such that a lengthwise gap GPL (FIG. 7) is formed therebetween.

First and second bracket walls 430 and 432 further include an inboard surface 436 and an outboard surface 438 opposite the inboard surface. In the embodiment shown in FIGS. 7-9, inboard surfaces 436 and base wall 426 together at least partially define a recess or channel 440 that extends lengthwise across base wall 426 and is dimensioned to at least partially receive the associated structural member (e.g., lower structural component LSC). Inboard surfaces 436 can be spaced apart from one another a distance sufficient to at least partially receive lower structural component LSC within channel 440, which distance is represented in FIG. 8 by reference dimension D2. In one exemplary arrangement, distance D2 can be greater than width WTH of lower structural component LSC such that the lower structural component can be received within channel 440 with clearance from the inboard surfaces along at least one of side surfaces FSF and SSF.

As illustrated in FIGS. 7-9, first and second bracket walls 430 and 432 are disposed on opposing sides of lower structural component LSC from one another. Additionally, first and second bracket walls 430 and 432 each includes an inboard edge IBE and an outboard edge OBE, and are disposed in offset or otherwise spaced relation to one another in the lengthwise direction such that lengthwise gap GPL is formed between inboard edges IBE. As such, an enlarged channel or opening (not numbered) is formed between first and second bracket walls 430 and 432 that extends at a non-zero angle relative to inboard surfaces 436, such as is represented by angular reference dimension AG1 in FIG. 9, for example. It will be appreciated that the enlarged channel or opening formed between the first and second bracket walls can have a width dimension, which is represented in FIG. 9 by reference dimension ECH, that is greater than that of channel 440 (i.e., dimension D2) and greater than the width of lower structural component LSC (i.e., width dimension WTH in FIG. 9).

In use, the lower structural component can be received within the enlarged channel or opening of piston 404. Gas spring assembly 400, or piston 404 thereof, can be rotated about axis AX, as is represented in FIG. 9 by arrows RT. In this manner, inboard surfaces 436 of bracket walls 430 and 432 can be respectively positioned in approximate alignment with first and second side surfaces FSF and SSF of lower structural component LSC. It will be appreciated that a lower structural component having an increased width tolerance range and/or an increased straightness tolerance range can be used and that the mounting configuration of piston 404 can accommodate the use of such increased tolerance ranges.

Bracket walls 430 and 432 can be of any size, shape, configuration and/or arrangement suitable for supporting at least a portion of base wall 426 in spaced relation to a facing planar surface (e.g., first planar surface FPS) of the associated structural member. As one example, inboard surfaces 436 can extend from along base wall 426 (or another portion of piston 404) at a non-zero angle relative to one another, such as, for example, at an angle within a range of from approximately 0.5 degrees to approximately 45 degrees. As another example, which is shown in FIGS. 7 and 8, inboard surfaces 436 can extend from along base wall 426 (or another portion of piston 404) in approximate alignment with one another (e.g., parallel to one another).

Additionally, outboard surfaces 438 of bracket walls 430 and 432 can include any suitable combination of features and/or elements for supporting at least a portion of base wall 426 in spaced relation to a facing planar surface (e.g., first planar surface FPS) of the associated structural member. In addition to the transmission of longitudinally-acting forces between the associated structural member and the gas spring assembly, bracket walls 430 and 432 can also incur forces associated with lateral load conditions between the sprung and unsprung masses that may be transferred through the gas spring assembly. Accordingly, bracket walls 430 and 432 can optionally include one or more additional features and/or elements. For example, one or more gusset walls can extend between the bracket walls and the base wall of the piston. In the exemplary arrangement shown, a plurality of gusset walls 442 extend from along outboard surfaces 438 and operatively interconnect with base wall 426.

Piston 404 can be formed from any suitable material or combination of materials, such as metal (e.g., aluminum) or polymeric material (e.g., polyamide). It will be appreciated that, in some cases, the overall configuration and arrangement of piston 404 may be well suited for certain plastic manufacturing processes, such as injection molding, for example. In such case, bracket walls 430 and 432 can optionally include one or more connection elements that are rigidly affixed on or along the bracket walls. As one example, a plurality of metal bushings 444 could be at least partially embedded into the bracket walls, such as by over-molding the bushings during an injection molding operation, for example. Additionally, or in the alternative, a plurality of gusset walls 442A can extend between bushings 444 and the bracket walls adjacent distal end surfaces 434.

Bushings 444, if included, can include a passage or opening 446 (FIGS. 8 and 9) formed therethrough that is suitable for receiving an associated securement device or element, such as a pin, rod or threaded fastener, for example. If bushings or other connection elements are not used, a passage or opening (not shown) through the bracket walls can be provided. If provided, bushings 444 can be positioned in spaced-apart relation to one another in the lengthwise direction with each bushing affixed along a different one of bracket walls 430 and 432, such as is shown in FIGS. 7-9, for example. Additionally, bushings 444 are preferably positioned along the bracket wall such that a centerline CL is spaced away from base wall 426, as is represented in FIG. 8 by reference dimension D3. In a preferred arrangement, dimension D3 is greater than dimension D1 such that gap GAP can be formed and maintained when the second end member (e.g., piston 404) is assembled together with the associated structural member (e.g., lower structural component LSC).

The associated securement device or element that is used in shear to support the second end member in spaced relation to the associated structural member and to secure the second end member on or along the same can be of any suitable type, kind, configuration and/or construction suitable for withstanding the shear loads associated with the subject design and retaining the second end member on or along the associated structural member. As mentioned above, components such as pins and rods with appropriate retention features could be used. As shown in FIGS. 7-9, a threaded fastener 448, such as a shoulder bolt, for example, can be used and can extend through openings 446 and passage PSG. A corresponding threaded nut 450 is shown as threadably engaging fastener 448 to secure and retain the fastener within the openings and passage. Additionally, threaded nut 450 can be used to tension fastener 448 by compressing lower structural member LSC between bushings 444 such that an inner surface of the bushings (not numbered) abuttingly engages one of the side surfaces of the lower structural member. In some cases, tensioning fastener 448, as described above, can cause the piston to rotate into position relative to the lower structural component and/or cause the bracket walls to deflect inwardly, and thereby securely engage the lower structural component.

As shown in FIGS. 7-9, piston 404 can, optionally, include one or more support projections 452 that extend from along base wall 426 in a direction toward lower structural component LSC from which base wall 426 is spaced. Support projection 452 can extend from the base wall and terminate at an end surface 454 that is spaced a predetermined distance from centerline CL, which distance is represented in FIG. 7 by dimension D3'. In a preferred arrangement, dimension D3' is greater than dimension D1 such that a gap GAP' is formed and maintained when the second end member (e.g., piston 404) is assembled together with the associated structural member (e.g., lower structural component LSC). If provided, it will be appreciated that the support projections can be of any suitable size, shape, form, configuration and/or arrangement, such as by being formed from one or more ribs, rings or posts that project from the base wall in a pattern suitable for forming a support projection. Additionally, support projections 452 are shown as being spaced apart from one another in a lengthwise direction along the associated structural member, and positioned in an offset alignment with respect to axis AX. Furthermore, the one or more support projections are preferably integrally formed on or along the base wall of the piston, such as by molding or casting, for example.

Figure 10:
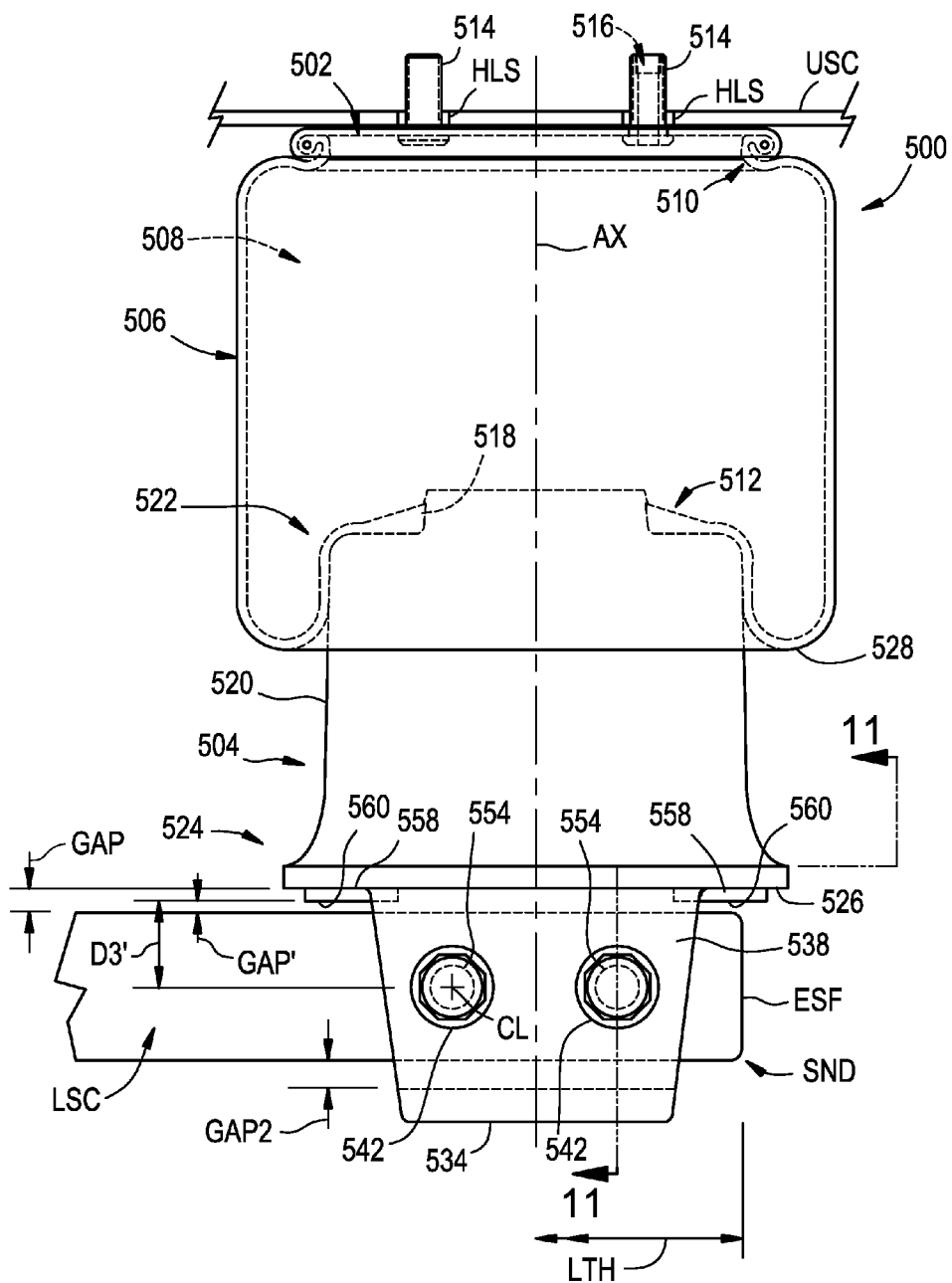
FIG. 10 is a side view of still another example of a gas spring assembly in accordance with the subject matter of the present disclosure shown assembled on an associated structural component.
Figure 11:
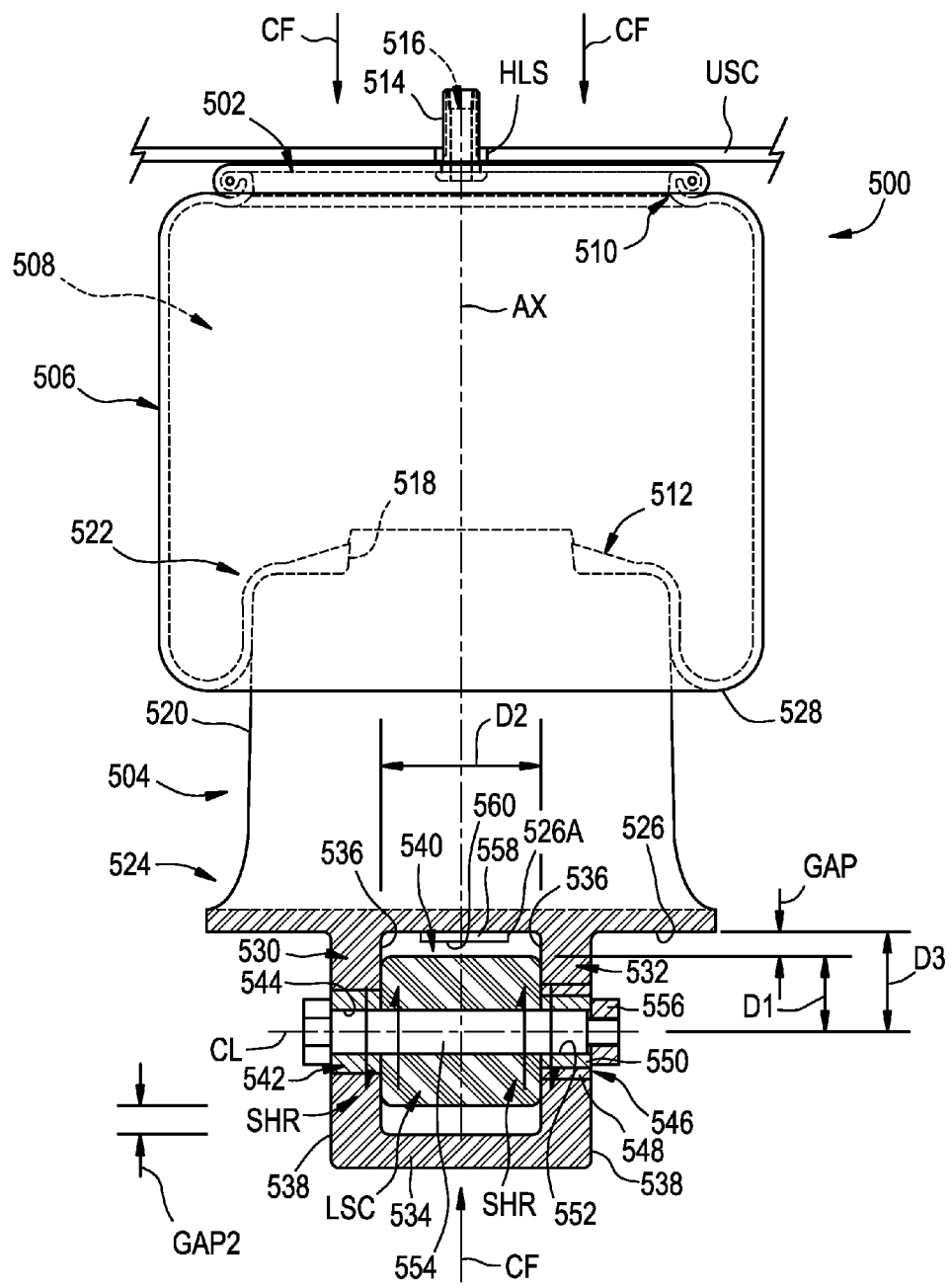
FIG. 11 is an end view of the exemplary gas spring assembly in FIG. 10 shown in partial cross-section, which is taken from along line 11-11 in FIG. 10.

Still another example of a gas spring assembly 500, such as may be suitable for use as one of gas spring assemblies 102 in FIG. 1, for example, is shown in FIGS. 10 and 11 as including a first end member, such as a top or bead plate 502, for example, and a second end member, such as a gas spring piston 504, for example, that is spaced from the first end member such that a longitudinal axis AX is at least partially formed therebetween. A flexible wall, such as a flexible sleeve 506, for example, is secured between bead plate 502 and piston 504 and at least partially forms a spring chamber 508 therebetween. Flexible sleeve 506 includes an upper mounting bead 510 and a lower mounting bead 512 formed along opposing ends thereof.

Upper mounting bead 510 of the flexible sleeve 506 is shown as being captured by the outer peripheral edge (not numbered) of bead plate 502. It will be appreciated that the peripheral edge can be deformed around the upper mounting bead in any manner suitable for forming a substantially fluid-tight seal therewith. Alternately, other connection arrangements could be employed without departing from the subject matter of the present disclosure. One or more securement devices, such as mounting studs 514, for example, can be included along bead plate 502. In the exemplary embodiment shown in FIGS. 10 and 11, mounting studs 514 project outwardly from bead plate 502 and are secured thereon in a suitable manner, such as, for example, by way of a flowed-material joint (not shown) or a press-fit connection (not identified). Such one or more securement devices may be suitable for securing the bead plate 502 on or along an associated structural member, such as through holes HLS in an upper structural component USC of a vehicle and receiving one or more threaded nuts or other securement devices (not shown), for example. A fluid communication port, such as a fluid passage 516, for example, can optionally be provided to permit fluid communication with a spring chamber 508. In the exemplary embodiment shown, fluid passage 516 extends through at least one of studs 514 and is in fluid communication with spring chamber 508. However, it will be appreciated that any other suitable fluid communication arrangement could alternately be used.

A gas spring assembly according to the subject matter of the present disclosure includes a second end member that is spaced from the first end member and is operatively connected across an end of the flexible wall. As mentioned above, piston 504 is shown in FIGS. 10 and 11 as representing the second end member of gas spring assembly 500, which is shown as being of a rolling lobe-type construction. It will be appreciated, however, that other configurations and/or constructions could alternately be used. For example, a convoluted bellows-type construction could be used in which the second end member could have certain characteristics and/or features of a conventional top cap or a conventional bead plate, such as bead plate 502, for example.

If a gas spring piston is used, it will be appreciated that the mounting bead of the flexible wall (e.g., lower mounting bead 512) can be secured on the gas spring piston in any suitable manner. For example, although not illustrated in FIG. 10 or 11, the lower mounting bead of the flexible sleeve could be captured between an end closure and the piston in a conventional manner, and the end closure could be secured on the piston assembly using a suitable securement device or assembly, such as a mounting stud and nut, for example. Alternately, piston 504 can include a bead mounting wall 518 that is adapted to receive and retain lower mounting bead 512, such as is shown in FIGS. 10 and 11, for example.

Additionally, it will be appreciated that gas spring pistons of a wide variety of sizes, shapes and configurations have been developed and that the specific configuration illustrated herein is merely exemplary. In FIGS. 10 and 11, gas spring piston 504 is shown as including an outer side wall 520 that extends generally longitudinally from a first end 522 that is disposed toward bead mounting wall 518 to a second end 524 that is adjacent a base wall 526, which is disposed transverse to axis AX. In use as a component of gas spring assembly 500, a portion of flexible sleeve 506 forms a rolling-lobe 528 that is displaced along outer side wall 520 as the gas spring assembly undergoes changes in overall height, such as, for example, may be due to variations in load conditions applied thereto, as is well understood by those of skill in the art. It will be recognized that a wide variety of shapes, profiles and/or configurations can and have been used in forming the first or outer side wall of gas spring pistons. As such, it will be appreciated that the profile of first side wall 520 is merely exemplary.

As discussed above, the second end member of a gas spring assembly in accordance with the subject matter of the present disclosure is supported on an associated structural member, such as is represented in FIGS. 10 and 11 by lower structural component LSC, for example. Additionally, as discussed above, it will be recognized that the embodiment of lower structural component LSC shown in FIGS. 10 and 11 is merely exemplary, and this exemplary embodiment of the lower structural component has been described in detail above. As such, a description of lower structural component LSC is not repeated here. However, it will be understood that like reference characters to those shown in FIGS. 2-4 are used in FIGS. 10 and 11.

As has also been discussed above in detail, the second end member of a gas spring assembly in accordance with the subject matter of the present disclosure is adapted for securement on or along the associated structural member such that a base surface of the second end member can be supported in spaced apart relation to a corresponding upper or planar surface of the associated structural member that is facing the base surface. In this manner, a gap or space can be maintained between the base surface of the second end member and the planar surface of the associated structural member such that the base surface can be substantially free from contact with the corresponding planar surface. The gap or space may be suitable accommodating variations in the size, shape and/or surface condition of the associated structural member, such as, for example, may be due to the surface finish and/or dimensional tolerance of the planar surface.

One manner in which the second end member of a gas spring assembly in accordance with the subject matter of the present disclosure can be secured on or along an associated structural member such that the base surface of the second end member can be supported in spaced apart relation to a corresponding planar surface of the associated structural member is by including one or more bracket walls on the second end member. The one or more bracket walls can extend longitudinally outwardly beyond the base surface of the second end member in a direction opposite the first end member. One or more associated securement devices or elements can be used to operatively interconnect the one or more bracket walls with the associated structural member such that an axial force (which is represented as compressive force by arrows CF in FIG. 11) acting on the gas spring assembly in a substantially longitudinal direction will primarily result in the one or more bracket walls generating shear forces (which are represented by arrows SHR in FIG. 11) in the associated securement element.

In the exemplary arrangement shown in FIGS. 10 and 11, the second end member includes a plurality of bracket walls that are spaced apart from one another and at least partially define a channel for receiving at least a portion of the associated structural member. More specifically, piston 504 includes a first bracket wall 530 and a second bracket wall 532 that is spaced apart from the first bracket wall. The first and second bracket walls project longitudinally-outwardly beyond base wall 526 toward a connector wall 534 that extends between and operatively interconnects bracket walls 530 and 532. The first and second bracket walls extend in a lengthwise direction (which is transverse to axis AX) across base wall 526 and include an inboard surface 536 and an outboard surface 538 opposite the inboard surface.

In the embodiment shown in FIGS. 10 and 11, inboard surfaces 536, base wall portion 526A and connector wall 534 together at least partially define a recess or channel 540 that extends lengthwise across base wall 526 and is dimensioned to at least partially receive the associated structural member (e.g., lower structural component LSC). Inboard surfaces 536 can be spaced apart from one another a distance sufficient to at least partially receive lower structural component LSC within channel 540, which distance is represented in FIG. 11 by reference dimension D2. In one exemplary arrangement, distance D2 can be greater than width WTH of lower structural component LSC such that the lower structural component can be received within channel 540 with clearance from the inboard surfaces along at least one of side surfaces FSF and SSF.

Bracket walls 530 and 532 can be of any size, shape, configuration and/or arrangement suitable for supporting at least a portion of base wall 526 in spaced relation to a facing planar surface (e.g., first planar surface FPS) of the associated structural member. As one example, inboard surfaces 536 can extend from along base wall 526 (or another portion of piston 504) at a non-zero angle relative to one another, such as, for example, at an angle within a range of from approximately 0.5 degrees to approximately 45 degrees. As another example, which is shown in FIGS. 10 and 11, inboard surfaces 536 can extend from along base wall 526 (or another portion of piston 504) in approximate alignment with one another (e.g., parallel to one another).

Additionally, outboard surfaces 538 of bracket walls 530 and 532 can include any suitable combination of features and/or elements for supporting at least a portion of base wall 526 in spaced relation to a facing planar surface (e.g., first planar surface FPS) of the associated structural member. In addition to the transmission of longitudinally-acting forces between the associated structural member and the gas spring assembly, bracket walls 530 and 532 can also incur forces associated with lateral load conditions between the sprung and unsprung masses that may be transferred through the gas spring assembly. Accordingly, bracket walls 530 and 532 can optionally include one or more additional features and/or elements. For example, one or more gusset walls (not shown) can extend between the bracket walls and the base wall of the piston.

Piston 504 can be formed from any suitable material or combination of materials, such as metal (e.g., aluminum) or polymeric material (e.g., polyamide). It will be appreciated that, in some cases, the overall configuration and arrangement of piston 504 may be well suited for certain plastic manufacturing processes, such as injection molding, for example. In such case, bracket walls 530 and 532 can optionally include one or more connection elements that are rigidly affixed on or along the bracket walls.

As one example, a plurality of metal bushings 542 could be at least partially embedded into the bracket walls, such as by over-molding the bushings during an injection molding operation, for example. Bushings 542, if included, can include a passage or opening 544 (FIG. 11) formed therethrough that is suitable for receiving an associated securement device or element, such as a pin, rod or threaded fastener, for example. If bushings or other connection elements are not used, a passage or opening (not shown) through the bracket walls can be provided.

As another example, a plurality of slide bushings 546 could be at least partially embedded or otherwise affixed on or along one or more of the bracket walls. In the exemplary arrangement shown in FIG. 11, slide bushings 546 include an outer sleeve 548 and an inner sleeve 550 that is slidably supported within the outer sleeve. Inner sleeve 550 includes a passage or opening 552 formed therethrough that is suitable for receiving an associated securement device or element, such as a pin, rod or threaded fastener, for example.

If provided, one of bushings 542 and one of bushings 546 are preferably positioned as a set along bracket walls 530 and 532 such that openings 544 and 552 are at least approximately aligned with one another along a centerline CL (FIG. 11). Optionally, two or more sets of bushings 244 can be used, such as is shown in FIG. 10 by positioning first and second sets of bushings in spaced-apart relation to one another in the lengthwise direction along the bracket walls. Additionally, bushings 542 and 546 are positioned along the bracket walls such that centerline CL is spaced away from base wall portion 526A, as is represented in FIG. 11 by reference dimension D3. In a preferred arrangement, dimension D3 is greater than dimension D1 such that gap GAP can be formed and maintained when the second end member (e.g., piston 504) is assembled together with the associated structural member (e.g., lower structural component LSC). Additionally, connector wall 534 is disposed in spaced relation to second planar surface SPF of lower structural component LSC such that a gap GAP2 is maintained therebetween.

The associated securement device or element that is used in shear to support the second end member in spaced relation to the associated structural member and to secure the second end member on or along the same can be of any suitable type, kind, configuration and/or construction suitable for withstanding the shear loads associated with the subject design and retaining the second end member on or along the associated structural member. As mentioned above, components such as pins and rods with appropriate retention features could be used. As shown in FIGS. 10 and 11, a threaded fastener 554, such as a shoulder bolt, for example, can be used and can extend through openings 544 and 552 as well as passage PSG. A corresponding threaded nut 556 is shown as threadably engaging fastener 554 to secure and retain the fastener within the openings and passage. Additionally, threaded nut 556 can be used to tension fastener 554 by compressing lower structural member LSC between bushings 542 and 546 such that an inner surface of the bushings (not numbered) abuttingly engage one of the side surfaces of the lower structural member. It will be appreciated that bracket walls 530 and 532 may have a reduced tendency to deflect due to the presence of connector wall 534, which will act to maintain the position of the bracket walls relative to one another. In such case, the inclusion of slide bushing 546 will permit the associated securement device to be tightened such that at least one of the bracket walls as well as the inner sleeve of the slide bushing abuttingly engage the opposing side surfaces of the associated structural member.

As shown in FIGS. 10 and 11, piston 504 can, optionally, include one or more support projections 558 that extend from along base wall 526 in a direction toward lower structural component LSC from which base wall 526 is spaced. Support projection 558 can extend from the base wall and terminate at an end surface 560 that is spaced a predetermined distance from centerline CL, which distance is represented in FIG. 10 by dimension D3'. In a preferred arrangement, dimension D3' is greater than dimension D1 such that a gap GAP' is formed and maintained when the second end member (e.g., piston 504) is assembled together with the associated structural member (e.g., lower structural component LSC). If provided, it will be appreciated that the support projections can be of any suitable size, shape, form, configuration and/or arrangement, such as by being formed from one or more ribs, rings or posts that project from the base wall in a pattern suitable for forming a support projection. Additionally, support projections 558 are shown as being spaced apart from one another in a lengthwise direction along the associated structural member, and positioned in an offset alignment with respect to axis AX. Furthermore, the one or more support projections are preferably integrally formed on or along the base wall of the piston, such as by molding or casting, for example.

It will be appreciated that the gas spring assemblies of the present disclosure can be operatively connected between the sprung and unsprung masses of an associated vehicle in any suitable manner. For example, as shown in FIG. 1 the gas spring assemblies can be operatively connected between wheel-engaging members and a body of a vehicle VHC. It will be appreciated, however, that the configuration of vehicle VHC in FIG. 1 is merely a schematic representation of the structural components of the sprung and unsprung masses of the vehicle. Thus, it will be understood that this schematic representation is provided for purposes of discussion and ease of understanding and is not intended to be in any way limiting.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A gas spring assembly dimensioned for securement along an associated suspension member having an associated planar surface, an associated first side surface and an associated second side surface that are disposed transverse to the associated planar surface, said gas spring assembly comprising:
    a flexible wall that is formed from elastomeric material and that extends circumferentially about a longitudinal axis between a first end and a second end that is spaced longitudinally from said first end, said flexible wall at least partially defining a spring chamber;
a first end member operatively connected across said first end of said flexible wall; and,
a second end member operatively connected across said second end of said flexible wall, said second end member including:
a base wall disposed transverse to said longitudinal axis;
a first bracket wall extending longitudinally-outwardly from said base wall in a direction opposite said flexible wall, said first bracket wall disposed in approximate alignment with said longitudinal axis; and,
a second bracket wall extending longitudinally-outwardly from said base wall in a direction opposite said flexible wall, said second bracket wall disposed in approximate alignment with said longitudinal axis;
said first and second bracket walls having a transverse length and extending in a lengthwise direction across at least a portion of said base wall, said first and second bracket walls disposed in offset relation to one another in said lengthwise direction with said base wall, said first bracket wall and said second bracket wall at least partially defining a channel dimensioned to receive the associated suspension member such that said second end member is securable on the associated suspension member with said base wall disposed in longitudinally spaced-apart relation to the associated planar surface of the associated suspension member and such that a gap is formed between said base wall and the associated planar surface.

2. A gas spring assembly according to claim 1, wherein said second end member includes a passage wall that at least partially defines a passage extending through at least one of said first and second bracket walls, said passage oriented transverse to said longitudinal axis, said passage dimensioned to receive an associated fastener for securement of said second end member along the associated suspension member by the associated fastener.

3. A gas spring assembly according to claim 2, wherein at least one of said first and second bracket walls are secured in abutting engagement with at least the associated first side surface of the associated suspension member such that, during use, axial forces acting on said second end member are substantially entirely carried to the associated suspension member by the associated fastener.

4. A gas spring assembly according to claim 1, wherein said gap is a first gap, and said second end member includes at least one projection extending longitudinally-outwardly from along said base wall in a direction opposite said flexible wall, said projection including an end surface spaced longitudinally from said base wall such that a second gap that is less than said first gap is formed between said base wall and the associated planar surface when said second end member is supported on the associated suspension member.

5. A gas spring assembly according to claim 2, wherein said passage wall is a first passage wall of said first bracket wall and said passage is a first passage extending through said first bracket wall, said second bracket wall including a second passage wall that at least partially defines a second passage extending through said second bracket wall, said second passage oriented transverse to said longitudinal axis, said second passage disposed offset in said lengthwise direction from and oriented in approximate alignment with said first passage, said second passage dimensioned to receive another associated fastener such that said second end member is securable along the associated suspension member by a plurality of associated fasteners.

6. A gas spring assembly according to claim 1, wherein said first and second bracket walls include free ends opposite said base wall.

7. A gas spring assembly according to claim 1, wherein said first bracket wall extends in said lengthwise direction between an inboard edge and an outboard edge, said second bracket wall extends in said lengthwise direction between an inboard edge and an outboard edge, and said first and second bracket walls are offset relative to one another such that a gap is formed in said lengthwise direction between said inboard edges of said first and second bracket walls.

8. A gas spring assembly according to claim 7, wherein said channel has a width defined between an inside surface of said first bracket wall and an inside surface of said second bracket wall, an opening is formed between said inboard edges that is oriented at a non-zero angle relative to said lengthwise direction, and said opening has a width dimension that is greater than said width of said channel.

9. A gas spring assembly according to claim 8, wherein the associated suspension member has an associated member width, and at least said second end member is rotatable about said longitudinal axis in a first rotational direction to receive the associated suspension member within said opening when the associated member width is greater than said channel width.

10. A gas spring assembly according to claim 9, wherein at least said second end member is rotatable about said longitudinal axis in a second rotational direction that is opposite said first rotational direction to abuttingly engage the first and second bracket walls with the associated suspension member when the associated member width is less than said width of said channel.

11. A gas spring assembly dimensioned for securement along an associated suspension member having an associated first side surface and an associated second side surface opposite the associated first side surface, said gas spring assembly comprising:
a flexible wall at least partially formed from an elastomeric material and having a longitudinal axis, said flexible wall extending peripherally about said longitudinal axis between a first end and a second end spaced longitudinally from said first end, said flexible wall at least partially defining a spring chamber;
a first end member operatively connected across said first end of said flexible wall; and,
a second end member operatively connected across said second end of said flexible wall, said second end member including:
a base wall disposed transverse to said longitudinal axis;
a first bracket wall extending longitudinally-outwardly from said base wall in a direction opposite said flexible wall, said first bracket wall disposed in approximate alignment with said longitudinal axis; and
a second bracket wall extending longitudinally-outwardly from said base wall in a direction opposite said flexible wall, said second bracket wall disposed in approximate alignment with said longitudinal axis;
said first and second bracket walls having a transverse length and extending in a lengthwise direction across at least a portion of said base wall, said first and second bracket walls disposed in offset relation to one another in said lengthwise direction with said base wall, said first bracket wall and said second bracket wall at least partially defining a channel dimensioned to receive the associated suspension member.

12. A gas spring assembly according to claim 11, wherein the associated suspension member has an associated member width, said channel has a channel width between said first and second bracket walls, said first and second bracket walls include an inboard edge and an outboard edge with said first and second bracket walls spaced apart such that an opening is formed between said inboard edges at least said second end member being rotatable about said longitudinal axis in a first rotational direction to receive the associated suspension member within said opening when the associated member width is greater than said channel width, and at least said second end member being rotatable in a second rotational direction about said longitudinal axis that is opposite said first rotational direction to abuttingly engage the first and second bracket walls with the associated suspension member when the associated member width is less than said channel width of said channel.

13. A gas spring assembly according to claim 11, wherein the associated suspension member includes an associated planar surface, and said second end member is supported on the associated suspension member with said base wall disposed in longitudinally spaced-apart relation to the associated planar surface of the associated suspension member such that a gap is formed between said base wall and the associated planar surface.

14. A gas spring assembly according to claim 13, wherein said gap is a first gap, and said second end member includes at least one projection extending longitudinally-outwardly from along said base wall in a direction opposite said flexible wall, said projection including an end surface spaced longitudinally from said base wall such that a second gap that is less than said first gap is formed between said base wall and the associated planar surface when said second end member is supported on the associated suspension member.

15. A gas spring assembly according to claim 11, wherein the associated suspension member includes associated first and second side surfaces disposed transverse to the associated planar surface, and at least one of said first and second bracket walls are secured in abutting engagement with at least the associated first side surface of the associated suspension member such that, during use, axial forces acting on said second end member are substantially entirely carried to the associated suspension member by an associated fastener operatively connected therebetween.

16. A gas spring assembly according to claim 11, wherein said first bracket wall extends in said lengthwise direction between an inboard edge and an outboard edge, said second bracket wall extends in said lengthwise direction between an inboard edge and an outboard edge, and said first and second bracket walls are offset relative to one another such that a gap is formed in said lengthwise direction between said inboard edges of said first and second bracket walls.

17. A gas spring assembly according to claim 16, wherein said channel has a width defined between an inside surface of said first bracket wall and an inside surface of said second bracket wall, an opening is formed between said inboard edges that is oriented at a non-zero angle relative to said lengthwise direction, and said opening has a width dimension that is greater than said width of said channel.

18. A gas spring assembly according to claim 17, wherein the associated suspension member has an associated member width, and at least said second end member are rotatable about said longitudinal axis in a first rotational direction to receive the associated suspension member within said opening when the associated member width is greater than said channel width.

19. A gas spring assembly according to claim 18, wherein at least said second end member are rotatable about said longitudinal axis in a second rotational direction that is opposite said first rotational direction to abuttingly engage the first and second bracket walls with the associated suspension member when the associated member width is less than said width of said channel.

20. A gas spring end member comprising:
an end member body having a longitudinal axis, said end member body extending longitudinally between a first end dimensioned for securement to the associated flexible wall and a second end spaced longitudinally from said first end and dimensioned for abutting engagement with an associated suspension member, said end member body including:
a base wall extending in at least a lateral direction oriented transverse to said longitudinal axis;
a first bracket wall extending longitudinally-outward from said base wall in a direction extending away from said first end, said first bracket wall laterally offset from and oriented in approximate alignment with said longitudinal axis; and,
a second bracket wall extending longitudinally-outward from said base wall in a direction extending away from said first end, said second bracket wall laterally offset from and oriented in approximate alignment with said longitudinal axis;
said first and second bracket walls having a wall length oriented transverse to said longitudinal axis and said lateral direction, said first and second bracket walls extending in a lengthwise direction across at least a portion of said base wall, said first and second bracket walls disposed in offset relation to one another in said lengthwise direction with said base wall, said first bracket wall and said second bracket wall at least partially defining a channel dimensioned to receive the associated suspension member.

21. A gas spring end member according to claim 20, wherein said first and second bracket walls include free ends opposite said base wall.

22. A gas spring end member according to claim 20, wherein said first bracket wall is laterally offset from said longitudinal axis in a first lateral direction and said second bracket wall is laterally offset from said longitudinal axis in a second lateral direction that is opposite said first lateral direction.

23. A gas spring end member according to claim 20, wherein said first bracket wall extends in said lengthwise direction between an inboard edge and an outboard edge, said second bracket wall extends in said lengthwise direction between an inboard edge and an outboard edge, and said first and second bracket walls are offset relative to one another such that a gap is formed in said lengthwise direction between said inboard edges of said first and second bracket walls.

24. A gas spring end member according to claim 23, wherein said channel has a width defined between an inside surface of said first bracket wall and an inside surface of said second bracket wall, an opening is formed between said inboard edges that is oriented at a non-zero angle relative to said lengthwise direction, and said opening has a width dimension that is greater than said width of said channel.

25. A gas spring end member according to claim 24, wherein the associated suspension member has an associated member width, and at least said second end member are rotatable about said longitudinal axis in a first rotational direction to receive the associated suspension member within said opening when the associated member width is greater than said channel width and rotated about said longitudinal axis in a second rotational direction that is opposite said first rotational direction to abuttingly engage the first and second bracket walls with the associated suspension member when the associated member width is less than said width of said channel.

* * * * *